US010794378B2

(12) United States Patent
Tanaka et al.

(10) Patent No.: US 10,794,378 B2
(45) Date of Patent: Oct. 6, 2020

(54) FLUID CONTROL DEVICE, DECOMPRESSION DEVICE, AND COMPRESSION DEVICE

(71) Applicant: Murata Manufacturing Co., Ltd., Kyoto (JP)

(72) Inventors: Nobuhira Tanaka, Kyoto (JP); Masaaki Fujisaki, Kyoto (JP); Hiroshi Takemura, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 119 days.

(21) Appl. No.: 15/943,832

(22) Filed: Apr. 3, 2018

(65) Prior Publication Data

US 2018/0223829 A1  Aug. 9, 2018

Related U.S. Application Data

(63) Continuation of application No. PCT/JP2016/079212, filed on Oct. 3, 2016.

(30) Foreign Application Priority Data

Oct. 5, 2015  (JP) ................................. 2015-197801
Jul. 25, 2016  (JP) ................................. 2016-145207

(51) Int. Cl.
*F04B 45/047* (2006.01)
*F04B 45/04* (2006.01)
(Continued)

(52) U.S. Cl.
CPC .......... *F04B 45/047* (2013.01); *F04B 35/045* (2013.01); *F04B 43/046* (2013.01);
(Continued)

(58) Field of Classification Search
CPC ...... F04B 45/047; F04B 45/04; F04B 35/045; F04B 43/046; F04B 45/041; F04B 45/045;
(Continued)

(56) References Cited

U.S. PATENT DOCUMENTS 5,354,032 A * 10/1994 Sims ..................... F16K 31/005
251/129.06
6,071,087 A * 6/2000 Jalink, Jr. .............. F04B 17/03
417/322
(Continued)

FOREIGN PATENT DOCUMENTS

CN  104302913 A  1/2015
JP  2012528981 A  11/2012
(Continued)

OTHER PUBLICATIONS

International Search Report for International Application No. PCT/JP2016/079212, dated Dec. 20, 2016.
(Continued)

*Primary Examiner* — John Bastianelli
(74) *Attorney, Agent, or Firm* — Pearne & Gordon LLP

(57) ABSTRACT

A fluid control device (1) includes a case (21) including a case top plate, a case side plate, and a case bottom plate and having an internal space (59) and a cavity, a pump (11) provided at a position at which the pump (11) divides the internal space (59) into a bottom-plate-side region and a top-plate-side region, the pump (11) being configured to generate a flow of a fluid between the bottom-plate-side region and the top-plate-side region and control the flow direction of the fluid, and a fixing member (31) that fixes the case (21) in place. The case (21) is mounted on the fixing member (31) by using the case top plate or the case bottom plate as a mounting surface (B).

23 Claims, 17 Drawing Sheets

(51) Int. Cl.
  *F04B 35/04* (2006.01)
  *F16K 99/00* (2006.01)
  *F04B 43/04* (2006.01)
  *F04B 39/10* (2006.01)
(52) U.S. Cl.
  CPC ............ *F04B 45/04* (2013.01); *F04B 45/041* (2013.01); *F04B 45/045* (2013.01); *F16K 99/0048* (2013.01); *F04B 39/1066* (2013.01); *F05B 2260/407* (2013.01); *F05B 2260/60* (2013.01)
(58) Field of Classification Search
  CPC ............ F04B 39/1066; F05B 2260/407; F05B 2260/60; F16K 99/0048
  USPC .............................................. 251/129.06, 367
  See application file for complete search history.

(56) References Cited

U.S. PATENT DOCUMENTS

| | | | | |
|---|---|---|---|---|
| 6,104,127 A * | 8/2000 | Kameyama | ............ | F04B 43/046 310/324 |
| 7,198,250 B2 * | 4/2007 | East | ............ | F04B 43/046 251/129.06 |
| 7,682,137 B2 * | 3/2010 | Nakayama | ............ | H01L 23/467 310/317 |
| 8,596,998 B2 * | 12/2013 | Fujisaki | ............ | F04B 43/046 417/413.2 |
| 8,747,080 B2 | 6/2014 | Kodama et al. | | |
| 2006/0232167 A1 | 10/2006 | Jordan | | |
| 2011/0073788 A1 * | 3/2011 | Marcus | ............ | F16K 99/0007 251/30.01 |
| 2013/0071273 A1 | 3/2013 | Locke et al. | | |
| 2015/0071797 A1 | 3/2015 | Takeuchi | | |
| 2015/0150470 A1 | 6/2015 | Sano et al. | | |

FOREIGN PATENT DOCUMENTS

| | | |
|---|---|---|
| JP | 2013-151908 A | 8/2013 |
| JP | 2013-245649 A | 12/2013 |
| JP | 2014-137032 A | 7/2014 |
| JP | 2014-526654 A | 10/2014 |
| WO | 2010/139918 A1 | 12/2010 |
| WO | 2011/145544 A1 | 11/2011 |
| WO | 2012/140931 A1 | 10/2012 |
| WO | 2013/187271 A1 | 12/2013 |

OTHER PUBLICATIONS

Written Opinion for International Application No. PCT/JP2016/079212, dated Dec. 20, 2016.

* cited by examiner

-- Prior Art --

-- Prior Art --

FLUID CONTROL DEVICE, DECOMPRESSION DEVICE, AND COMPRESSION DEVICE

This is a continuation of International Application No. PCT/JP2016/079212 filed on Oct. 3, 2016 which claims priority from Japanese Patent Application No. 2015-197801 filed on Oct. 5, 2015, and Japanese Patent Application No. 2016-145207 filed on Jul. 25, 2016. The contents of these applications are incorporated herein by reference in their entireties.

BACKGROUND OF THE DISCLOSURE

Field of the Disclosure

The present disclosure relates to a fluid control device that transports a fluid, a decompression device that sucks in a fluid, and a compression device that discharges a fluid.

Description of the Related Art

In the related art, a piezoelectric micropump that includes a piezoelectric actuator and a valve portion has been widely used in various devices (referred to as fluid control devices in the present disclosure) that operate with transportation of a fluid (see, for example, Patent Document 1). There is a case where a piezoelectric micropump is provided in a state in which a piezoelectric element and the like are accommodated in a case having an inlet and an outlet and is mounted inside a fluid control device while being stored in the case.

FIG. 17A is a schematic diagram illustrating an example of a mounting structure of the related art for mounting a pump in a fluid control device.

A fluid control device 101 includes a pump 111, a case 121 in which the pump 111 is stored, and a fixing member 131 such as a frame or an exterior plate. A packing member 133 is mounted on the fixing member 131, and a side surface of the case 121 is held by the packing member 133. The interior of the case 121 is partitioned into a space 124 on a bottom-surface side and a space 125 on a top-surface side by the pump 111. The pump 111 includes an actuator (not illustrated) and generates a flow of a fluid between the space 124 on the bottom-surface side and the space 125 on the top-surface side by driving the actuator. The pump 111 further includes a valve portion (not illustrated). The pump 111 controls the flow direction of the fluid as a result of the valve portion operating and generates a large pressure difference between the two spaces 124 and 125 so as to obtain a high fluid pressure.

Here, in the case where a flow of the fluid in a direction from the space 124 on the bottom-surface side toward the space 125 on the top-surface side of the case 121 is generated, when the space 124 on the bottom-surface side is in constant communication with an external space, and the space 125 on the top-surface side is connected to a pressure container, the space 125 on the top-surface side and the pressure container are pressurized to a fluid pressure higher than the external space. Thus, the fluid control device 101 in this case forms a compression device. When the space 125 on the top-surface side is in constant communication with the external space, and the space 124 on the bottom-surface side is connected to the pressure container, the space 124 on the bottom side and the pressure container are decompressed to a fluid pressure lower than the external space. Thus, the fluid control device 101 in this case forms a decompression device.

Patent Document 1: Japanese Unexamined Patent Application Publication (Translation of PCT Application) No. 2012-528981

BRIEF SUMMARY OF THE DISCLOSURE

In a compression device or a decompression device, when, for example, switching a pressure state, sound may sometimes be generated by deformation of a member, or frictional sound may sometimes be generated between members for the following reasons. FIG. 17B is a diagram schematically illustrating deformation that occurs in the case where the fluid control device 101 is formed as a compression device.

1. There is a large pressure difference between one of the two spaces 124 and 125 (the space 125 on the top-surface side in FIG. 17B) and the external space, and thus, deformation occurs, concomitantly with switching of the pressure state, in the top surface or the bottom surface (the top surface in FIG. 17B) of the case 121, the surface facing the one of the two spaces 124 and 125, such that the surface is brought into an inflated state, a deflated state, or a flat state. In addition, as a result of this deformation being transmitted to other members such as the fixing member 131 and the like, deformation may sometimes occur in the other members.

In particular, in the case where a change in the pressure in a pressure container due to deformation of the pressure container or according to temperature changes propagates to a pump, there is a possibility that a pressure difference equal to or larger than that which is expected to occur in the pump will be generated.

2. Deformation occurs in the top surface or the bottom surface of the case 121 concomitantly with switching of the pressure state, and the case 121, in which the pump 111 is accommodated, is caused to move in a direction toward the top surface or in a direction toward the bottom surface by the reaction force.

The deformation and the movement as mentioned above become factors of undesirable sound that is generated concomitantly with switching of the pressure state, and in addition, there is a possibility that the concomitant impact will cause problems such as gradual deterioration of the strength with which the case 121 is fixed in place, separation of members, and cracks occurring in the members.

In addition to the above-mentioned problems, there is a possibility that, in the case where the case 121 comes into contact with the pump 111 as a result of being deformed, stress will be applied to the pump 111, so that the characteristics of the pump 111 will change.

Accordingly, it is an object of the present disclosure to provide a fluid control device, a decompression device, and a compression device each of which is favorable in terms of quietness and durability and is capable of reducing the probability of undesirable sound and problems occurring concomitantly with switching of a pressure state.

A fluid control device according to the present disclosure includes a case including a top plate, a side plate, and a bottom plate that surround an internal space and having a cavity through which the internal space communicates with an external space, a pump provided at a position at which the pump divides the internal space into a top-plate-side region and a bottom-plate-side region, the pump including an actuator that generates a flow of a fluid between the top-plate-side region and the bottom-plate-side region and a valve portion that controls the flow direction of the fluid, and a fixing member fixing the case in place. The case is mounted on the fixing member by using the top plate or the bottom plate as a mounting surface.

In the above configuration, when the actuator is driven, the fluid pressure in one of the top-plate-side region and the bottom-plate-side region of the case becomes approximately equal to the pressure in the external space communicating with the regions through the cavity, and the pressure difference between the pressure in the other of the top-plate-side region and the bottom-plate-side region and the pressure in the external space becomes large by the valve portion. Thus, deformation occurs in one of the top plate and the bottom plate of the case, the one facing the region having a larger pressure difference. Although this deformation may become a factor in the occurrence of undesirable sound and problems, when the case is mounted to the fixing member by using the top plate or the bottom plate as the mounting surface as described above, movement caused by the reaction force generated by deformation of the top plate or the bottom plate of the case is suppressed, and thus, the probability of the occurrence of undesirable sound and problems can be reduced.

In addition, since the above-mentioned deformation is suppressed, one of the top-plate-side region and the bottom-plate-side region of the case, the one having a large pressure difference with respect to the pressure in the external space, can be arranged close to the pump by reducing the distance therebetween, and thus, the height of the fluid control device can be reduced.

In the fluid control device according to the present disclosure, during the period when the pump is operating, the pressure difference between the pressure in one of the top-plate-side region and the bottom-plate-side region, the one being closer to the mounting surface than the other is, and the pressure in the external space may be smaller than the pressure difference between the pressure in the other of the top-plate-side region and the bottom-plate-side region and the pressure in the external space. In this case, the top plate or the bottom plate in which only a small bending may occur due to the pressure difference with respect to the pressure in the external space serves as the mounting surface that is joined to the fixing member, and thus, the probability of problems such as cracking and separation occurring in a portion in which the case and the fixing member are joined together and the probability of undesirable sound and problems occurring in other members as a result of deformation being transmitted to the fixing member can be particularly reduced.

In the fluid control device according to the present disclosure, during the period when the pump is operating, the pressure difference between the pressure in one of the top-plate-side region and the bottom-plate-side region, the one being closer to the mounting surface than the other is, and the pressure in the external space may be larger than the pressure difference between the pressure in the other of the top-plate-side region and the bottom-plate-side region and the pressure in the external space. In this case, deformation of the top plate or the bottom plate facing the region having a large pressure difference with respect to the pressure in the external space is suppressed by the fixing member, and the probability of undesirable sound and problems occurring in the case and the pump can be particularly reduced.

Regarding one of the top-plate-side region and the bottom-plate-side region, the one having a larger pressure difference with respect to the pressure in the external space during the period when the pump is operating, it is preferable that the distance between the pump and the top plate or the distance between the pump and the bottom plate be sufficiently larger than the amount of deformation of the top plate or the amount of deformation or the bottom plate. This is because, by preventing the top plate or the bottom plate from coming into contact with the pump, the probability of the occurrence of a problem in that the characteristics of the pump will change can be reduced.

The fluid control device according to the present disclosure may include a nozzle that causes the internal space to communicate with a pressure container, and the nozzle may project from the mounting surface so as to pass through the fixing member. When connecting to the pressure container from the mounting surface of the case, if the fixing member includes a nozzle, it is necessary to make the space between the case and the fixing member airtight by using, for example, a packing member. Accordingly, as a result of providing the nozzle on the case, the nozzle projecting from the mounting surface so as to pass through the fixing member, it is not necessary to make the space between the case and the fixing member airtight, and the case can be fixed in place in a simpler manner without providing a packing member or the like.

The fluid control device according to the present disclosure may include a nozzle that causes the internal space to communicate with the pressure container, and the nozzle may be provided on the side plate. Also in this case, it is not necessary to seal the space between the case and the fixing member airtight by using, for example, a packing member, and the case can be fixed in place in a simpler manner without providing a packing member or the like. In addition, the area of a mounting surface in which the case and the fixing member are joined together increases, and thus, the strength of the mounting surface can be enhanced, and the probability of the occurrence of deformation can be further reduced.

The fluid control device according to the present disclosure may further include a control unit that intermittently drives the actuator. During an intermittent operation, each time the actuator is driven, deformation occurs in each portion, and undesirable sound and problems are highly likely to occur, and thus, the improvement effect according to the present disclosure is high.

A decompression device according to the present disclosure includes the above-described fluid control device and a pressure container communicating with a region that is decompressed below a pressure in an external space, the region being one of the top-plate-side region and the bottom-plate-side region. A compression device according to the present disclosure includes the above-described fluid control device and a pressure container communicating with a region that is compressed above a pressure in an external space, the region being one of the top-plate-side region and the bottom-plate-side region. The decompression device is, for example, a nasal aspirator, a breast pump, a secretion aspiration device for negative pressure wound therapy (NPWT), or the like. The compression device is, for example, an air mat, a cuff of a sphygmomanometer, or the like.

According to the present disclosure, the probability of undesirable sound and problems occurring concomitantly with switching of a pressure state can be reduced. Therefore, the probability of the occurrence of problems such as deterioration of the strength with which members are fixed to each other, cracks occurring in the members, and separation of the members can be reduced, and a fluid control device, a decompression device, and a compression device each of which is favorable in terms of quietness and durability can be provided.

DETAILED DESCRIPTION OF THE DISCLOSURE

First Embodiment

A fluid control device 1 according to a first embodiment will be described below.

Figure 1:
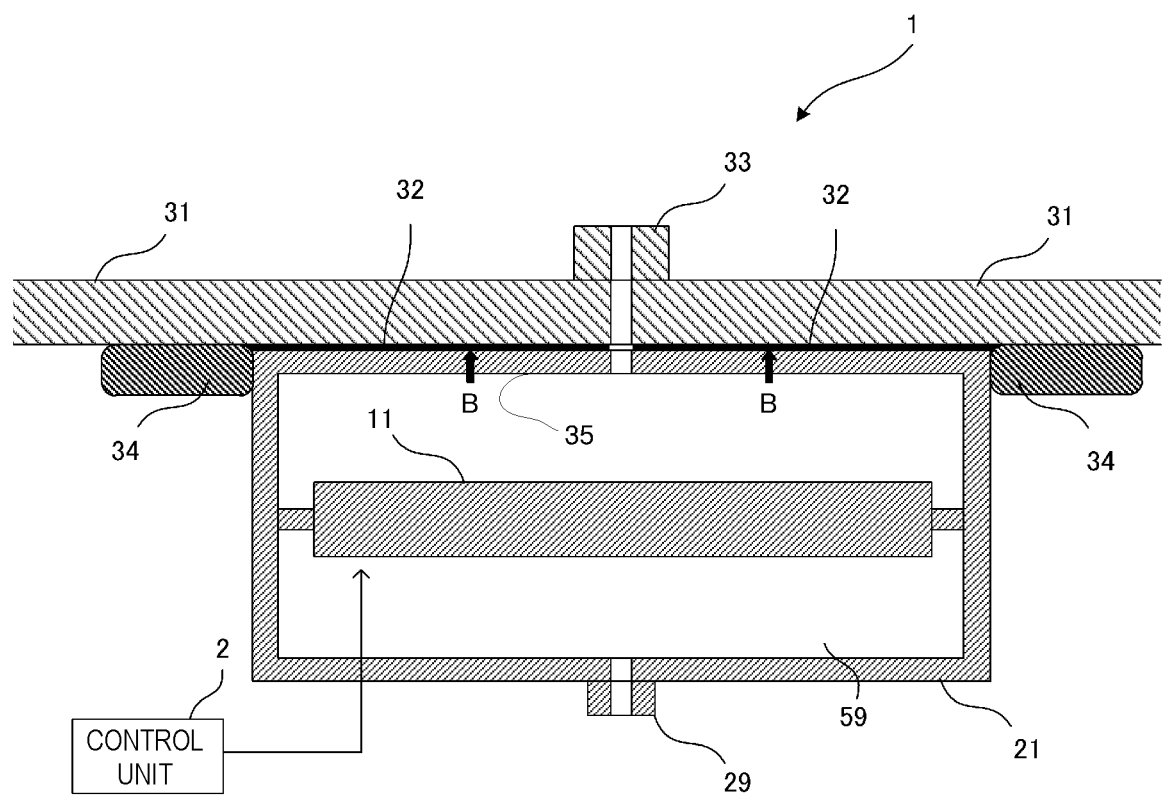
FIG. 1 is a sectional view schematically illustrating a fluid control device according to a first embodiment.

FIG. 1 is a sectional view schematically illustrating the fluid control device 1 according to the first embodiment.

The fluid control device 1 described herein is configured to operate with transportation of a gas, such as air, and is, for example, a nasal aspirator, a breast pump, a secretion aspiration device for negative pressure wound therapy (NPWT), an air mat, a cuff of a sphygmomanometer, or the like.

The fluid control device 1 includes a fixing member 31, an adhesive sheet 32, a packing member 34, a case 21, a pump 11, a control unit 2, and nozzles 29 and 33. The fixing member 31 corresponds to a "fixing member" described in the claims. As will be described later, the fixing member 31 is, for example, a housing of the fluid control device 1, a housing of a control unit provided in the fluid control device 1, a circuit board, a battery, a heat sink, a heat pipe, or the like. It is preferable that the fixing member 31 be made of a material having a rigidity higher than that of a mounting surface of the case 21. In addition, it is preferable that a material having a high modulus of elasticity, such as a metal, be used as the material of the fixing member 31. In the case of using a material having a low modulus of elasticity, such as a resin, it is preferable that the thickness of the fixing member 31 be larger than that of the case 21.

The case 21 is mounted on the fixing member 31 by using the top surface or the bottom surface of the case 21, which will be described later, as a mounting surface B. The nozzle 29 is attached to the case 21. The nozzle 33 is attached to the fixing member 31. One of the nozzle 29 and the nozzle 33 is configured to be connected to a pressure container (not illustrated) and corresponds to a "nozzle" described in the claims. The other of the nozzle 29 and the nozzle 33 is configured to communicate with an external space and corresponds to a "cavity" described in the claims. The pump 11 is placed in an internal space 59 of the case 21. The control unit 2 outputs an alternating-current (AC) drive voltage to the pump 11. The pump 11 is driven as a result of the AC drive voltage being applied thereto and generates a predetermined flow of a gas in the case 21. Thus, when the pump 11 is driven, the gas flows through the nozzles 29 and 33, and the pressure difference between the pressure container (not illustrated) and the external space can be increased. The adhesive sheet 32 is bonded to the mounting surface B of the case 21 and to the fixing member 31 so as to fix the case 21 and the fixing member 31 to each other. The packing member 34 is disposed so as to surround the outer periphery of the mounting surface B and to be in close contact with the case 21 and the fixing member 31 in order to maintain airtightness even if an adhesive failure occurs between the case 21 or the fixing member 31 and the adhesive sheet 32.

Alternatively, as will be described later, a configuration in which a surface having a large pressure difference with respect to the pressure in the external space is fixed to the pressure container may be employed. In this case, the pressure difference between two surfaces of a fixing portion 35 is reduced. Thus, deformation of the case is further suppressed, and a high effect of reducing the probability of the occurrence of undesirable sound and problems may be obtained.

The pressure container may be a thin bag-shaped container made of a resin material, such as nylon, examples of the thin bag-shaped container including a mat, a cuff, and a piece of gauze, or may be a box-shaped container made of a thick material.

Note that the case 21 and the fixing member 31 do not need to be fixed to each other by the adhesive sheet 32 and may be fixed to each other by other methods, examples of the other methods including using an adhesive, directly bonding, screw clamping, and fitting the case 21 and the fixing member 31 to each other. In addition, the packing member 34 does not need to be provided in the case where it is not necessary to make the surface at which the case 21 and the fixing member 31 are bonded to each other airtight.

Figure 2:
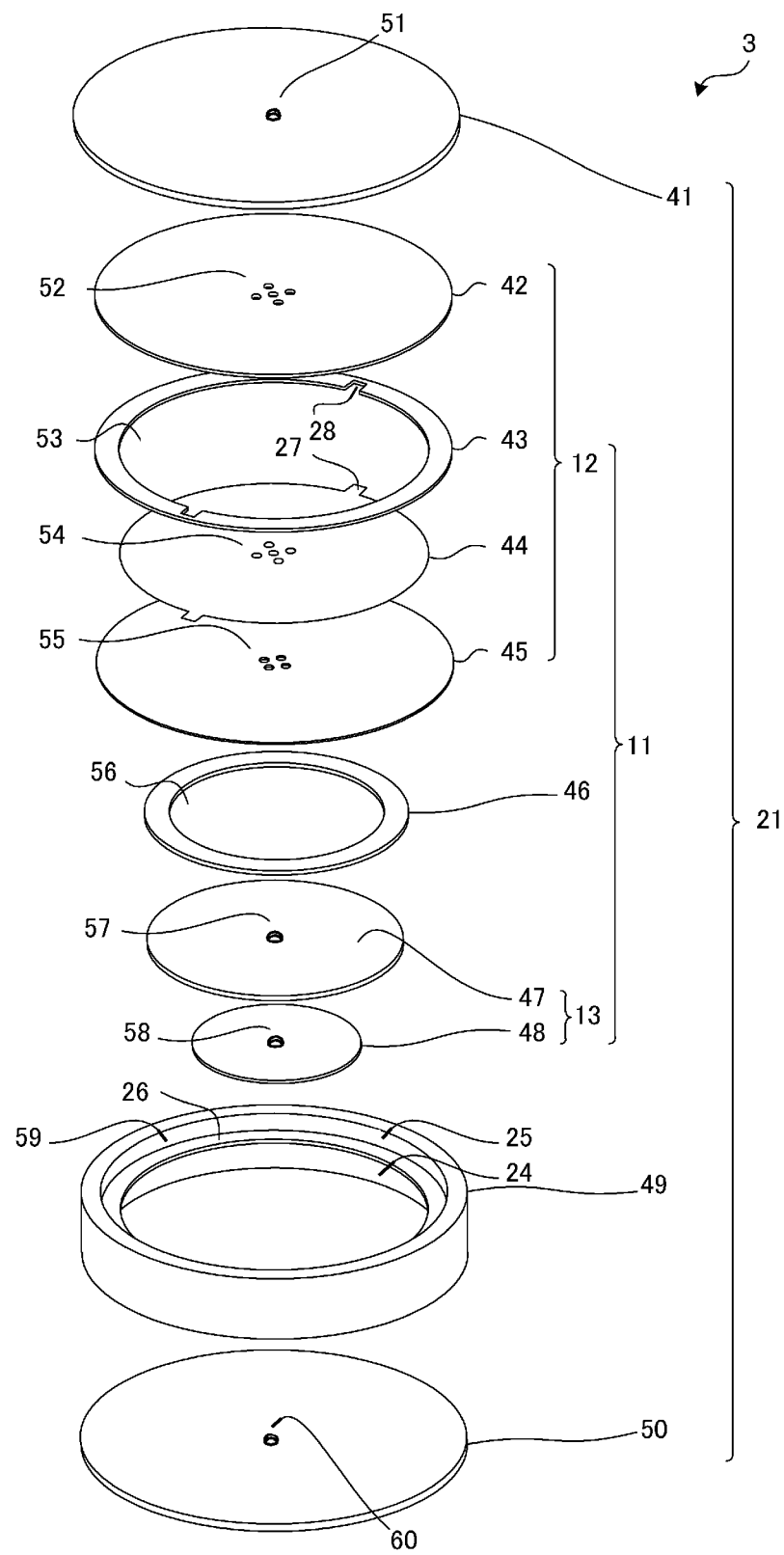
FIG. 2 is an exploded perspective view illustrating a configuration example of a case and a configuration example of a pump according to the first embodiment.
Figure 3:
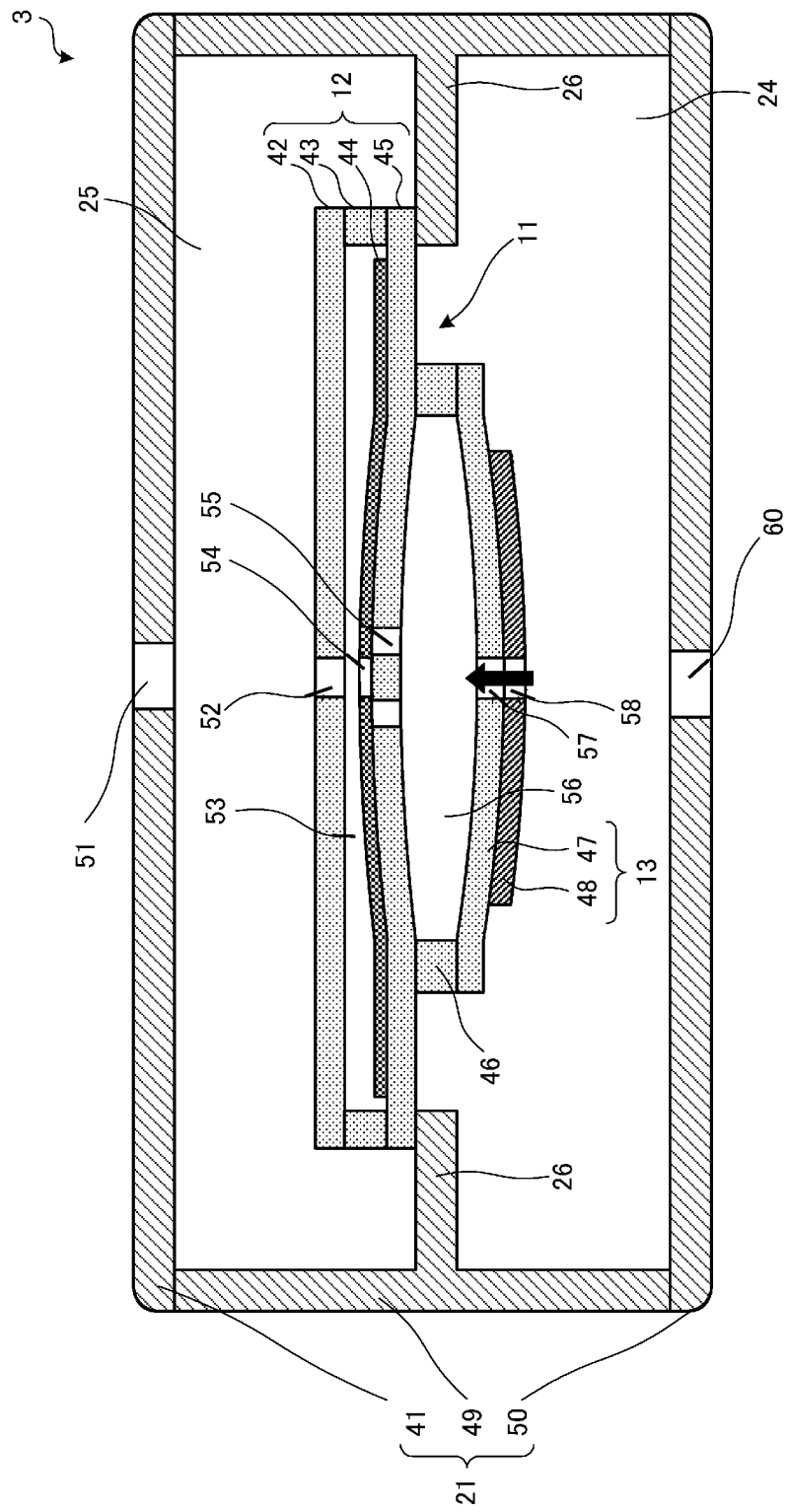
FIG. 3 is a sectional view illustrating a first operating state of the case and a first operating state of the pump according to the first embodiment.
Figure 4:
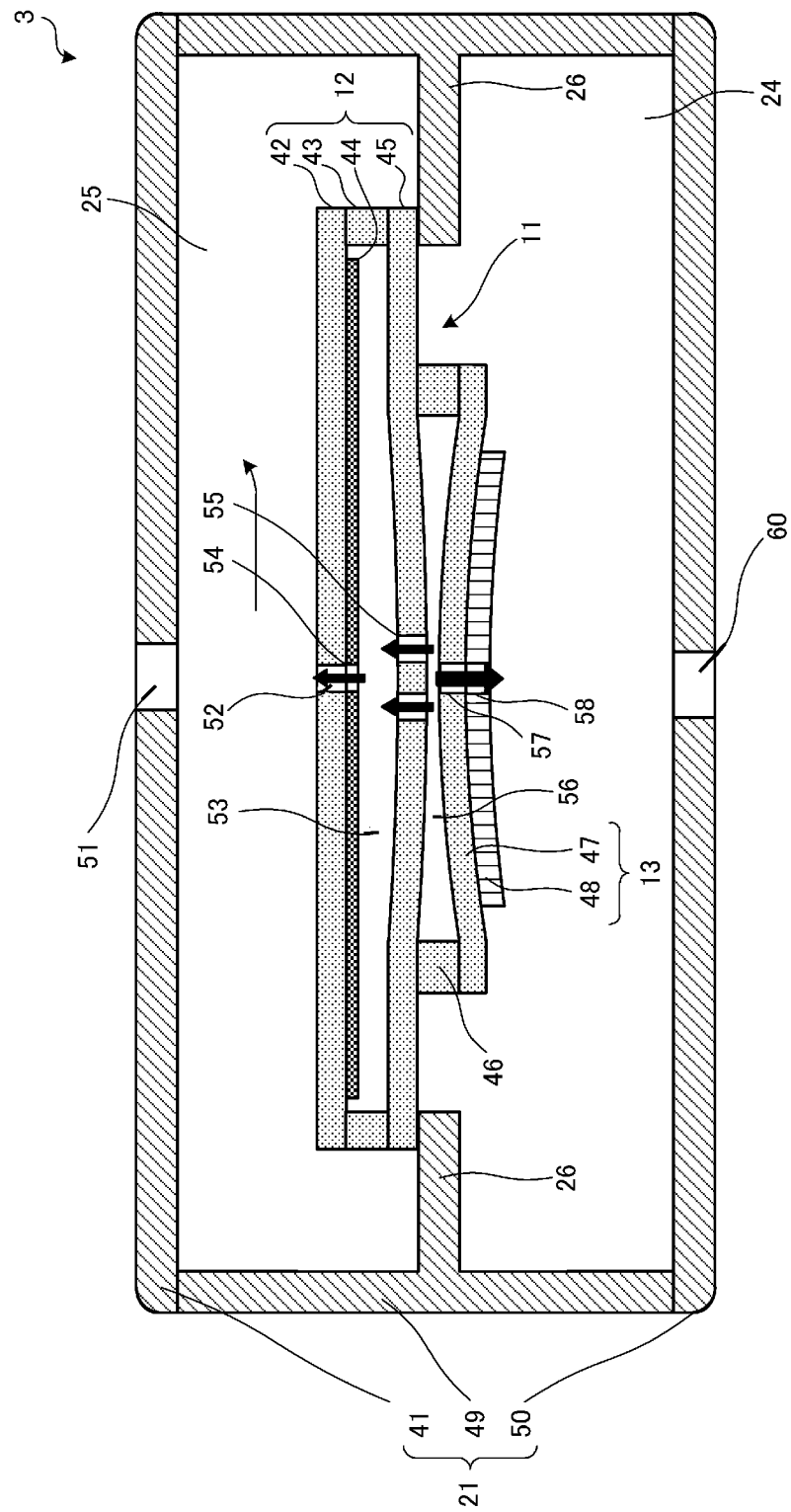
FIG. 4 is a sectional view illustrating a second operating state of the case and a second operating state of the pump according to the first embodiment.

FIG. 2 is an exploded perspective view illustrating a configuration example of the case 21 and a configuration example of the pump 11. FIG. 3 is a sectional view illustrating a first operating state in the above configuration examples. FIG. 4 is a sectional view illustrating a second operating state in the above configuration examples. In the case 21 and the pump 11, an upward direction in FIG. 2 will hereinafter be referred to as a top-surface direction or a top-surface side, and a downward direction in FIG. 2 will hereinafter be referred to as a bottom-surface direction or a bottom-surface side.

The case 21 and the pump 11 described herein form a multilayer module 3 having a multilayer structure formed of thin plate members. The multilayer module 3 includes a case top plate 41, a valve top plate 42, a valve side plate 43, a valve film 44, a valve bottom plate 45, a pump side plate 46, a vibrating plate 47, a piezoelectric element 48, a case side plate 49, a case bottom plate 50.

The case top plate 41, the case side plate 49, and the case bottom plate 50 are bonded to one another in a state of being stacked on top of one another in this order from the top-surface side toward the bottom-surface side so as to form the case 21.

The case top plate 41 is, for example, a member that is made of a resin and that has a circular plate-like shape and has a circular cavity 51 extending therethrough in the top-surface direction (bottom-surface direction). The cavity 51 functions as an outlet through which the gas is discharged from the inside of the case 21.

The case bottom plate 50 is, for example, a member that is made of a resin and that has a circular plate-like shape and has a circular cavity 60 extending therethrough in the top-surface direction (bottom-surface direction). The cavity 60 functions as an inlet through which the gas flows into the case 21.

The case side plate 49 is a cylindrical member that is disposed between the case top plate 41 and the case bottom plate 50, and the internal space 59 communicating with the cavity 51 of the case top plate 41 and the cavity 60 of the case bottom plate 50 is formed in the case side plate 49. The case side plate 49 includes a partition wall 26 that projects from the inner peripheral surface of the case side plate 49 toward the internal space 59 and that extends along the inner periphery of the case side plate 49. The partition wall 26 is positioned in the vicinity of the center of the case side plate 49 in the top-surface direction (bottom-surface direction).

The valve top plate 42, the valve side plate 43, the valve film 44, the valve bottom plate 45, the pump side plate 46, the vibrating plate 47, and the piezoelectric element 48 form the pump 11. An outer edge portion of the valve bottom plate 45, the outer edge portion facing toward the bottom-surface side, is joined to a surface of the partition wall 26 of the case side plate 49, the surface facing toward the top-surface side, so that the pump 11 is supported in the air between the case top plate 41 and the case bottom plate 50. In the internal space 59, a region that is located further toward the top-surface side than the pump 11 and the partition wall 26 are will hereinafter be referred to as a top-plate-side region 25 (see FIG. 3 and FIG. 4). In addition, in the internal space 59, a region that is located further toward the bottom-surface side than the pump 11 and the partition wall 26 are will hereinafter be referred to as a bottom-plate-side region 24 (see FIG. 3 and FIG. 4). In other words, the pump 11 is disposed at a position at which the pump 11 divides the internal space 59 of the case 21 into the top-plate-side region 25 and the bottom-plate-side region 24 and partitions, together with the partition wall 26, the top-plate-side region 25 and the bottom-plate-side region 24 from each other. The bottom-plate-side region 24 communicating with the cavity 60, which serves as the inlet, corresponds to a "first air chamber" according to the present disclosure, and the top-plate-side region 25 communicating with the cavity 51, which serves as the outlet, corresponds to a "second air chamber" according to the present disclosure.

The pump 11 further includes a valve 12 and an actuator 13. In the pump 11, the actuator 13 is located on the bottom-surface side and vibrates as a result of being driven so as to generate a flow of the gas in a direction from the bottom-plate-side region 24 toward the top-plate-side region 25. The valve 12 corresponds to a "valve portion" described in the claims and is located on the top-surface side in the pump 11. The valve 12 controls a flow of the gas in a direction from the top-plate-side region 25 toward the bottom-plate-side region 24 and limits the flow direction of the gas to the top-surface direction (direction from the bottom-plate-side region 24 toward the top-plate-side region 25).

The actuator 13 is formed by stacking the piezoelectric element 48 on the vibrating plate 47 on the bottom-surface side and joining the piezoelectric element 48 and the vibrating plate 47 to each other. The piezoelectric element 48 is formed by forming a top-surface-side electrode and a bottom-surface-side electrode on or in a piezoelectric member that is made of, for example, a PZT-based ceramic or the like and that has a circular plate-like shape, the piezoelectric member being elastic in an in-plane direction. The vibrating plate 47 is, for example, a member that is made of a metal material and that has a circular plate-like shape. The vibrating plate 47 deforms in such a manner as to be bent concentrically with the piezoelectric element 48 by restraining the expansion and contraction occurring in the piezoelectric element 48 in the in-plane direction (see FIG. 3 and FIG. 4). Thus, the actuator 13 is driven as a result of an AC drive voltage being applied to the piezoelectric element 48 and vibrates in such a manner as to be repeatedly bent in a concentric manner.

The vibrating plate 47 has a circular cavity 57 extending therethrough in the top-surface direction (bottom-surface direction). The piezoelectric element 48 has a circular cavity 58 extending therethrough in the top-surface direction (bottom-surface direction). The cavities 57 and 58 function as inlets through which the gas flows into the pump 11 from the bottom-plate-side region 24. Note that, here, although the cavities 57 and 58 are respectively positioned in the vicinity of the center of the vibrating plate 47 and in the vicinity of the center of the piezoelectric element 48, the cavity 58 does not need to be formed in the piezoelectric element 48, and the cavity 57 of the vibrating plate 47 may be formed at a position that is not superposed with the piezoelectric element 48. As a result, it is not necessary to perform drilling on the piezoelectric element 48, and accordingly, the piezoelectric element may be easily manufactured at low cost. In addition, a defect due to drilling of the piezoelectric element 48 will not occur, and thus, a failure of the piezoelectric element due to long-term use is less likely to occur.

The pump side plate 46 is stacked on and joined to the actuator 13 on the top-surface side. The pump side plate 46 is, for example, a member that is made of a metal and that has a ring-like shape and has a circular cavity 56 extending therethrough in the top-surface direction (bottom-surface direction). The cavity 56 functions as a pump chamber that generates a pressure change in the gas.

The valve bottom plate 45 is stacked on and joined to the pump side plate 46 on the top-surface side. The valve bottom plate 45 is, for example, a member that is made of a metal and that has a circular plate-like shape and has a plurality of circular cavities 55 extending therethrough in the top-surface direction (bottom-surface direction). The plurality of cavities 55 are arranged in a concentrated manner in the vicinity of the center of the valve bottom plate 45. The cavities 55 function as inlets through which the gas flows into the valve 12 from the pump chamber (cavity 56).

The valve 12 is formed by stacking the valve top plate 42, the valve side plate 43, and the valve bottom plate 45 on top of one another in this order from the top-surface side toward the bottom-surface side and joining these plates to one another while the valve film 44 is accommodated in the valve 12. The valve side plate 43 is, for example, a member that is made of a metal and that has a ring-like shape and has a circular cavity 53 extending therethrough in the top-surface direction (bottom-surface direction). The cavity 53 functions as a valve chamber in which the valve film 44 is accommodated. The valve top plate 42 is, for example, a member that is made of a metal and that has a circular plate-like shape and has a plurality of circular cavities 52 extending therethrough in the top-surface direction (bottom-surface direction). The plurality of cavities 52 are arranged in a concentrated manner in the vicinity of the center of the valve top plate 42. The cavities 52 function as outlets through which the gas is discharged from the valve chamber (cavity 53) to the top-plate-side region 25. Although better characteristics as a pump can be obtained with the plurality of cavities 52, only one cavity 52 may be formed. In addition, each of the cavities 52 does not need to have a circular shape.

The valve film 44 is a film member having a circular plate-like shape and has a plurality of circular cavities 54 extending therethrough in the top-surface direction (bottom-surface direction). The plurality of cavities 54 are arranged in a concentrated manner in the vicinity of the center of the valve film 44. The thickness of the valve film 44 is set to be smaller than the thickness of the valve side plate 43, and the outer diameter of the valve film 44 is set to be slightly smaller than the opening diameter of the valve chamber (cavity 53) (see FIG. 3 and FIG. 4). The valve film 44 is made of a lightweight resin such as polyimide so as to have an extremely small mass. As a result, the valve film 44 is freely movable in the valve chamber (cavity 53) in the top-surface direction (bottom-surface direction).

Note that the valve film 44 has protrusions 27 each of which is formed on a portion of the outer periphery of the valve film 44. Grooves 28 into which the protrusions 27 are fitted are formed in the inner peripheral surface of the valve side plate 43 so as to extend in the top-surface direction (bottom-surface direction). The protrusions 27 are fitted into the grooves 28, so that the valve film 44 will not rotate when the valve film 44 moves in the top-surface direction (bottom-surface direction) in the valve chamber (cavity 53).

The cavities 52 of the valve top plate 42 and the cavities 54 of the valve film 44 are located at positions at which each of the cavities 52 and a corresponding one of the cavities 54 face each other. In contrast, the cavities 55 of the valve bottom plate 45 and the cavities 54 of the valve film 44 are located at positions at which the cavities 55 and the cavities 54 do not face each other. Consequently, in a state where the valve film 44 has moved to the top-surface side and is in contact with the valve top plate 42, the cavities 52 of the valve top plate 42 and the corresponding cavities 54 of the valve film 44 communicate with each other. In contrast, in a state where the valve film 44 has moved to the bottom-surface side and is in contact with the valve bottom plate 45, the cavities 55 of the valve bottom plate 45 and the cavities 54 of the valve film 44 do not communicate with each other. As a result, in the valve 12, the movement of the valve film 44 changes an open/closed state of a flow path between the cavities 52 of the valve top plate 42 and the cavities 55 of the valve bottom plate 45.

Flows of the gas in the multilayer module 3 will now be described in detail with reference to FIG. 3 and FIG. 4. In FIG. 3 and FIG. 4, each black arrow indicates a flow of the gas.

FIG. 3 illustrates the first operating state in which the piezoelectric element 48 has expanded in the in-plane direction and in which the actuator 13 has been bent in a convex manner toward the bottom-surface side. In this state, the capacity of the pump chamber (cavity 56) increases, and the fluid pressure in the pump chamber (cavity 56) decreases. As a result, the pressure in the pump chamber (cavity 56) becomes a negative pressure with respect to the pressure in the valve chamber (cavity 53) and the pressure in the bottom-plate-side region 24. Then, in the valve chamber (cavity 53), the valve film 44 is pulled toward the bottom-surface side and brought into contact with the valve bottom plate 45. As a result, the cavities 55 of the valve bottom plate 45 are closed by the valve film 44. Consequently, the pump chamber (cavity 56) sucks in the gas from the bottom-plate-side region 24.

FIG. 4 illustrates a state in which the piezoelectric element 48 has contracted in the in-plane direction and in which the actuator 13 has been bent in a convex manner toward the top-surface side. In this state, the capacity of the pump chamber (cavity 56) decreases, and the fluid pressure in the pump chamber (cavity 56) increases. As a result, the pressure in the pump chamber (cavity 56) becomes a positive pressure with respect to the pressure in the valve chamber (cavity 53) and the pressure in the bottom-plate-side region 24. Then, in the valve chamber (cavity 53), the valve film 44 is pulled toward the top-surface side and brought into contact with the valve top plate 42. As a result, the cavities 52 of the valve top plate 42 are superposed with the corresponding cavities 54 of the valve film 44. Consequently, the pump chamber (cavity 56) discharges the gas to the top-plate-side region 25 through the valve chamber (cavity 53). In this case, a portion of the gas in the pump chamber (cavity 56) is also discharged to the bottom-plate-side region 24.

Thus, the flow of the gas is limited such that the gas passes through the inside of the valve 12 in a direction from the bottom-surface side toward the top-surface side. These operating states are alternately repeated during the period when the pump 11 is driven, and thus, a flow of the gas in a direction from the bottom-plate-side region 24 toward the top-plate-side region 25 steadily occurs in the case 21.

Deformation that occurs in the case 21 in a state where the pump 11 is driven in the fluid control device 1, which includes the multilayer module 3 illustrated in FIG. 2 to FIG. 4, will now be described in further detail.

Figure 5:
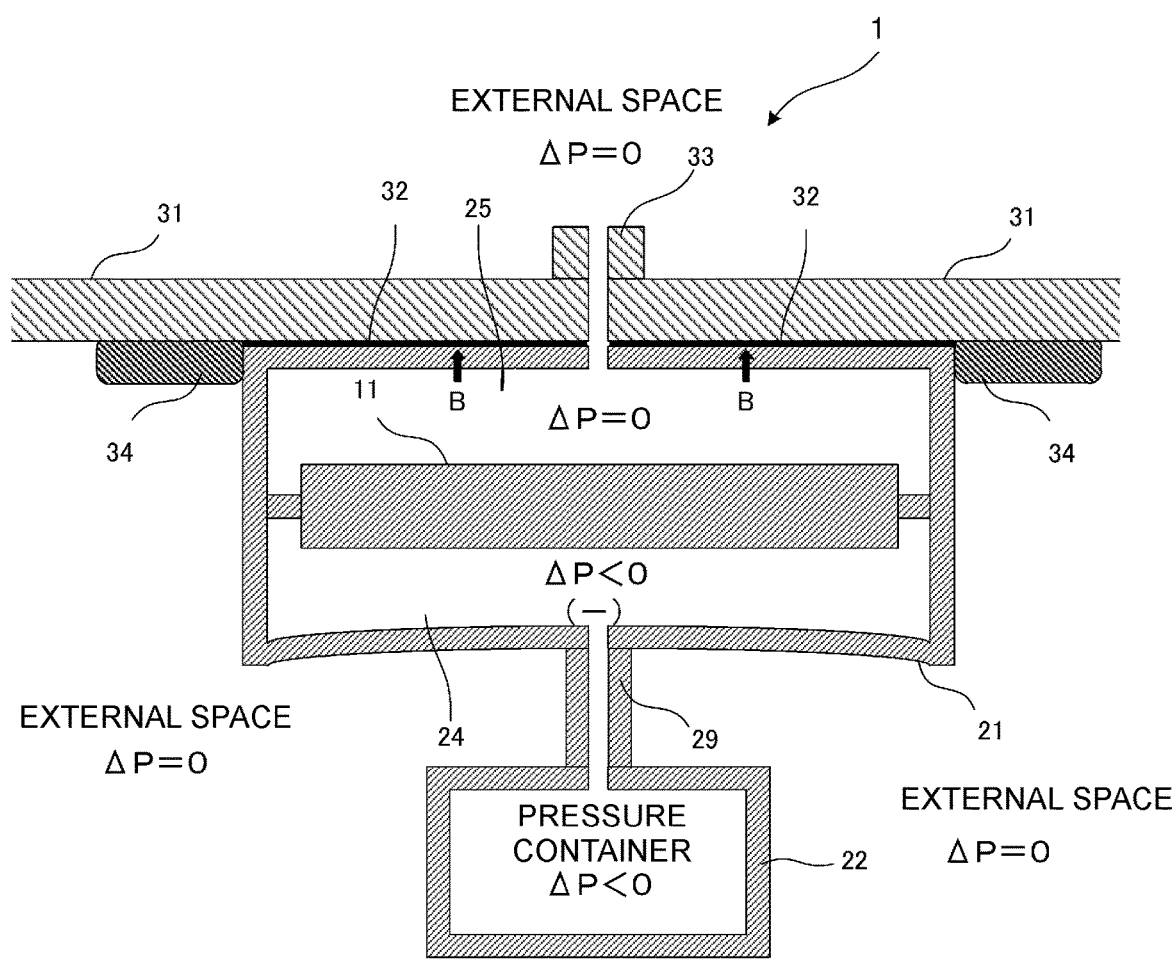
FIG. 5 is a sectional view illustrating a first example of deformation that occurs in the fluid control device according to the first embodiment.
Figure 6:
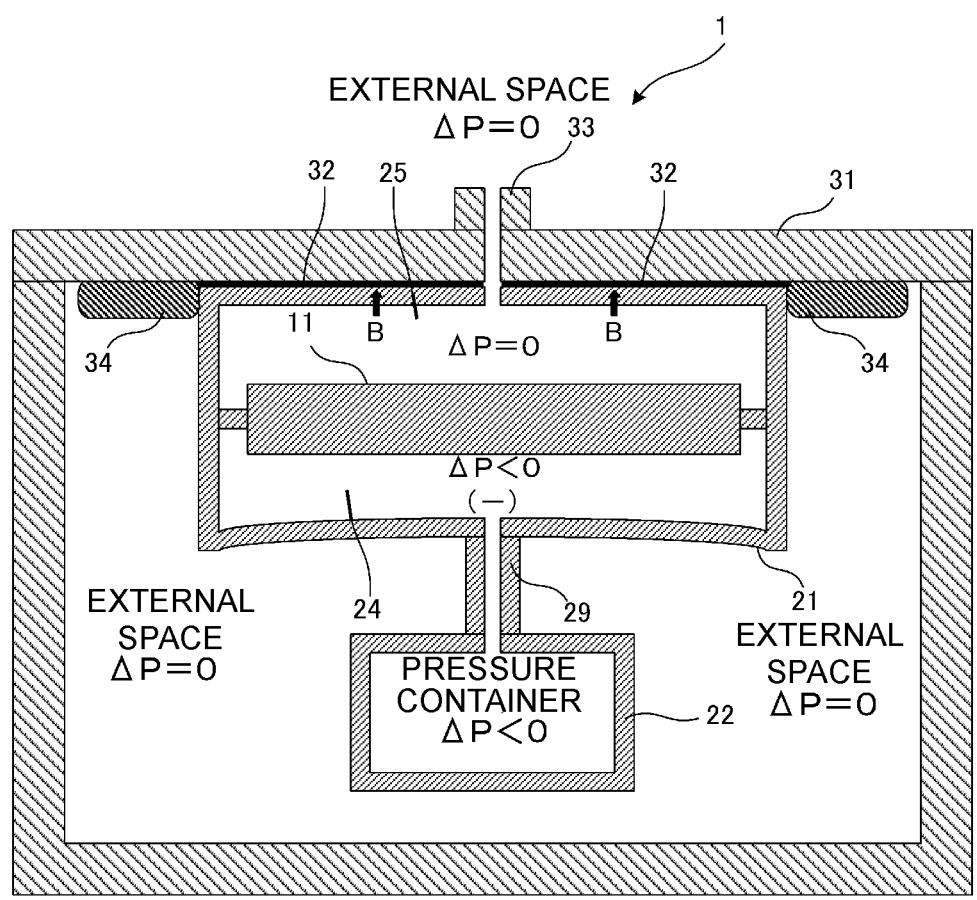
FIG. 6 is a diagram illustrating a specific configuration example of a fixing member included in the fluid control device according to the first embodiment.

FIG. 5 is a diagram illustrating a first example of deformation that occurs in the case 21 when the top surface of the case 21 is fixed to the fixing member 31 as the mounting surface B in the case where the fluid control device 1 is formed as a decompression device. FIG. 6 is a diagram illustrating a specific configuration example of the fixing member 31 of the fluid control device 1.

The flow of the fluid in a direction from the bottom-plate-side region 24 toward the top-plate-side region 25 occurs in the case 21, and thus, in the case of forming the fluid control device 1 as a decompression device it is necessary to connect a pressure container 22 to the bottom-plate-side region 24 of the case 21 and cause the top-plate-side region 25 of the case 21 to communicate with the external space. Thus, when the top surface of the case 21 is fixed onto the fixing member 31 as the mounting surface B, the nozzle 29 may be attached to the bottom surface of the case 21 and connected to the pressure container 22, and the nozzle 33 that is attached to the fixing member 31 may be caused to communicate with the external space. In the example illustrated in FIG. 6, the fixing member 31 is a housing of an apparatus into which the fluid control device is to be incorporated.

In such a state, when the pump 11 is driven, the pressure in the bottom-plate-side region 24 of the case 21 becomes a negative pressure with respect to that in the external space, and a pressure difference ΔP between the bottom-plate-side region 24 and the external space becomes negative. In addition, in the top-plate-side region 25 of the case 21, the fluid pressure becomes approximately equal to the external space, and the pressure difference ΔP between the top-plate-side region 25 and the external space becomes substantially zero. As a result, the case 21 deforms such that only the bottom surface of the case 21 is bent due to the pressure difference between the case 21 and the external space. Here, the height of the case 21 is small, and thus, the amount of deformation occurring in the side surfaces of the case 21 due to pressure is small.

Due to the reaction force generated by such deformation, the case 21 and the pump 11 try to move toward the bottom-surface side. However, since the top surface of the case 21 is fixed to the fixing member 31 as the mounting surface B, the case 21 and the pump 11 can hardly move toward the bottom-surface side.

Therefore, in the first example of deformation, the case 21 and the pump 11 will not be excited toward the bottom-surface side along with deformation, and the probability of the occurrence of undesirable sound and problems due to excitation can be reduced. In particular, in the first example of deformation, since the top surface of the case 21 in which only a small deformation may occur is fixed to the fixing member 31, deformation of the case 21 will not be transmitted to the fixing member 31, and deformation of the fixing member 31 is suppressed. Therefore, in the fluid control device 1 in this case, the probability of sound being generated by deformation of the fixing member 31, the probability of frictional sound being generated between the fixing member 31 and a different member, the probability of deterioration of the strength with which the fixing member 31 and a different member are fixed to each other, the probability of separation and cracks occurring in the fixing member 31 and other members, and so forth can be reduced.

Here, in the bottom-plate-side region 24, it is preferable that the distance between the case 21 and the pump 11 be large such that the case 21 will not come into contact with the pump 11 as a result of being deformed because, in this case, the probability of the occurrence of a problem in that the characteristics of the pump will change due to contact between the case 21 and the pump 11 can be reduced.

Figure 7:
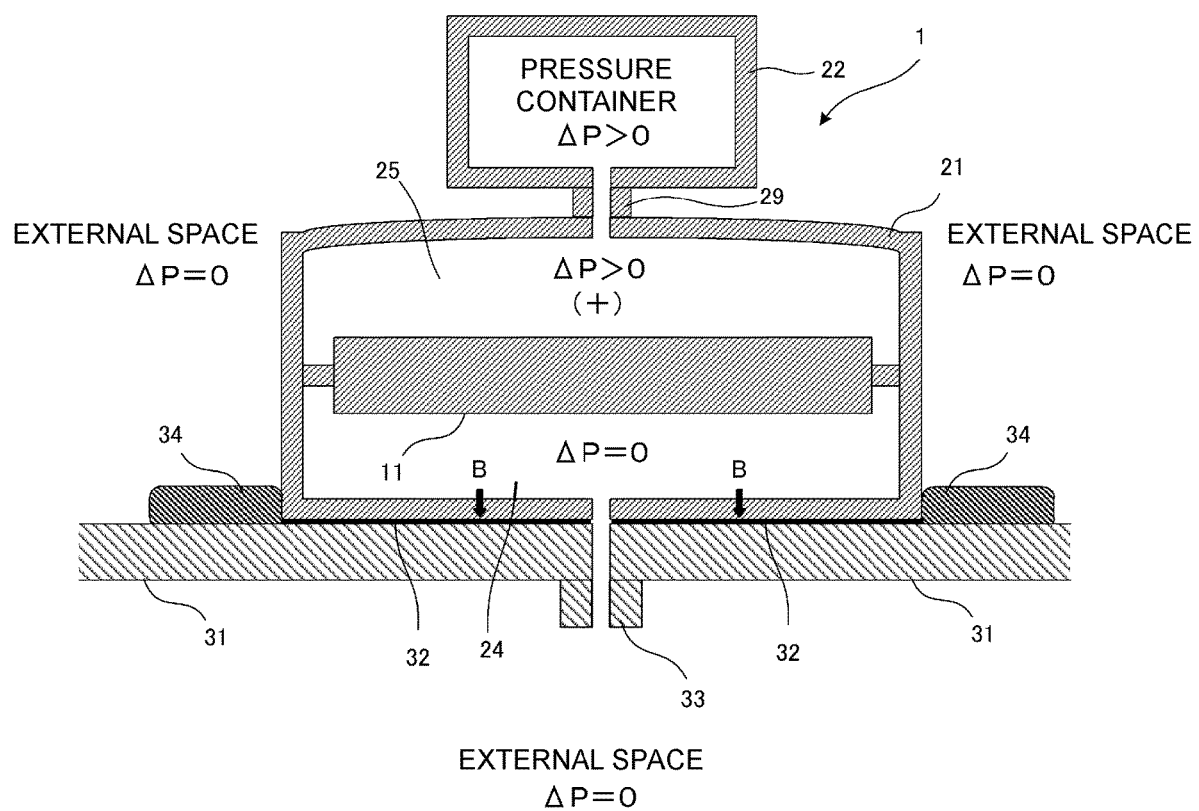
FIG. 7 is a sectional view illustrating a second example of deformation that occurs in the fluid control device according to the first embodiment.

FIG. 7 is a diagram illustrating a second example of deformation that occurs in the case 21 when the bottom surface of the case 21 is fixed to the fixing member 31 as the mounting surface B in the case where the fluid control device 1 is formed as a compression device.

Since the flow of the fluid in a direction from the bottom-plate-side region 24 to the top-plate-side region 25 occurs in the case 21, in the case of forming the fluid control device 1 as a compression device, it is necessary to connect the pressure container 22 to the top-plate-side region 25 of the case 21 and cause the bottom-plate-side region 24 of the case 21 to communicate with the external space. Thus, when the bottom surface of the case 21 is fixed onto the fixing member 31 as the mounting surface B, the nozzle 29 may be attached to the top surface of the case 21 and connected to the pressure container 22, and the nozzle 33 that is attached to the fixing member 31 may be caused to communicate with the external space.

In such a state, when the pump 11 is driven, the pressure in the top-plate-side region 25 of the case 21 becomes a positive pressure with respect to that in the external space, and the pressure difference ΔP between the top-plate-side region 25 and the external space becomes positive. In addition, in the bottom-plate-side region 24 of the case 21, the fluid pressure becomes approximately equal to the external space, and the pressure difference ΔP between the bottom-plate-side region 24 and the external space becomes substantially zero. As a result, the case 21 deforms such that only the top surface of the case 21 is bent due to the pressure difference between the case 21 and the external space.

Due to the reaction force generated by such deformation, the case 21 and the pump 11 try to move toward the bottom-surface side. However, since the bottom surface of the case 21 is fixed to the fixing member 31 as the mounting surface B, the case 21 and the pump 11 can hardly move toward the bottom-surface side.

Therefore, also in the second example of deformation, the case 21 and the pump 11 will not be excited toward the bottom-surface side along with deformation, and the probability of the occurrence of undesirable sound and problems due to excitation can be reduced. In addition, as is expected, also in the fluid control device 1 in this case, since the bottom surface of the case 21 in which only a small deformation may occur is fixed to the fixing member 31, deformation of the case 21 will not be transmitted to the fixing member 31, and deformation of the fixing member 31 is suppressed.

Figure 8:
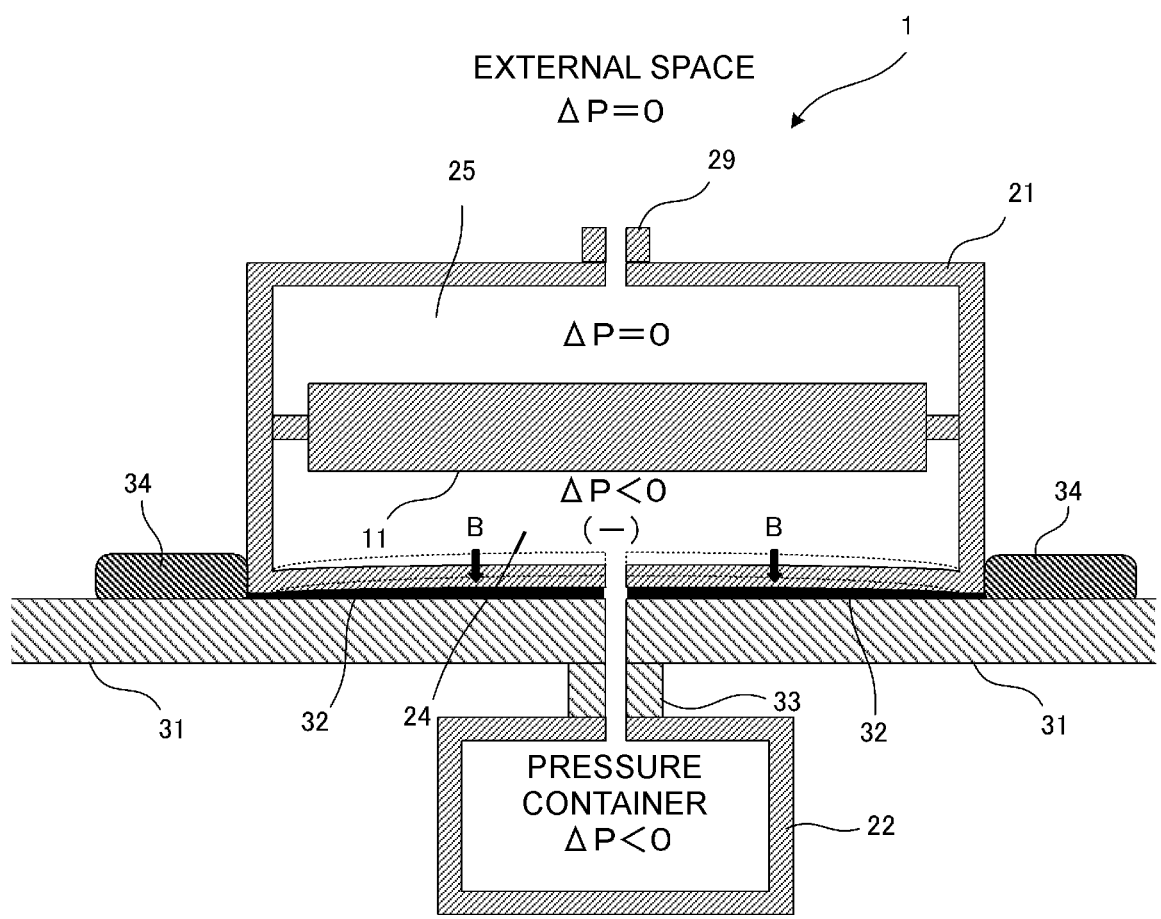
FIG. 8 is a sectional view illustrating a third example of deformation that occurs in the fluid control device according to the first embodiment.

FIG. 8 is a diagram illustrating a third example of deformation that occurs in the case 21 when the bottom surface of the case 21 is fixed to the fixing member 31 as the mounting surface B in the case where the fluid control device 1 is formed as a decompression device.

In this case, since the bottom surface of the case 21 is fixed to the fixing member 31 as the mounting surface B, the nozzle 29 may be attached to the top surface of the case 21 and may be caused to communicate with the external space, and the nozzle 33 that is attached to the fixing member 31 may be connected to the pressure container 22.

In such a state, when the pump 11 is driven, the pressure difference ΔP between the bottom-plate-side region 24 of the case 21 and the external space becomes negative, and a force that causes the bottom surface of the case 21 to deform in a recessed manner is generated. However, since the bottom surface of the case 21 is fixed to the fixing member 31 as the mounting surface B, only a small deformation may occur in the bottom surface of the case 21. In particular, in the case where the modulus of elasticity of the fixing member 31 is higher than the modulus of elasticity of the bottom surfaces of the case 21 or in the case where the thickness of the fixing member 31 is larger than the thickness of the bottom surface of the case 21, the effect of suppressing the deformation is high.

Thus, in the third example of deformation, the mounting surface B will not be excited, and the probability of the occurrence of undesirable sound and problems due to excitation can be reduced. In addition, especially in the third example of deformation, since the bottom surface of the case 21 in which deformation may occur is fixed to the fixing member 31, the amount of deformation of the bottom surface of the case 21 is reduced. Therefore, in the fluid control device 1 in this case, the probability of separation and cracks occurring in the members included in the multilayer module 3, the probability of undesirable sound being generated by the multilayer module 3, and so forth can be reduced.

In addition, since the amount of deformation of the bottom surface of the case 21 is reduced, the pump 11 and the bottom surface of the case 21 can be arranged so as to be close to each other, and the height of the fluid control device 1 can be reduced.

Figure 9:
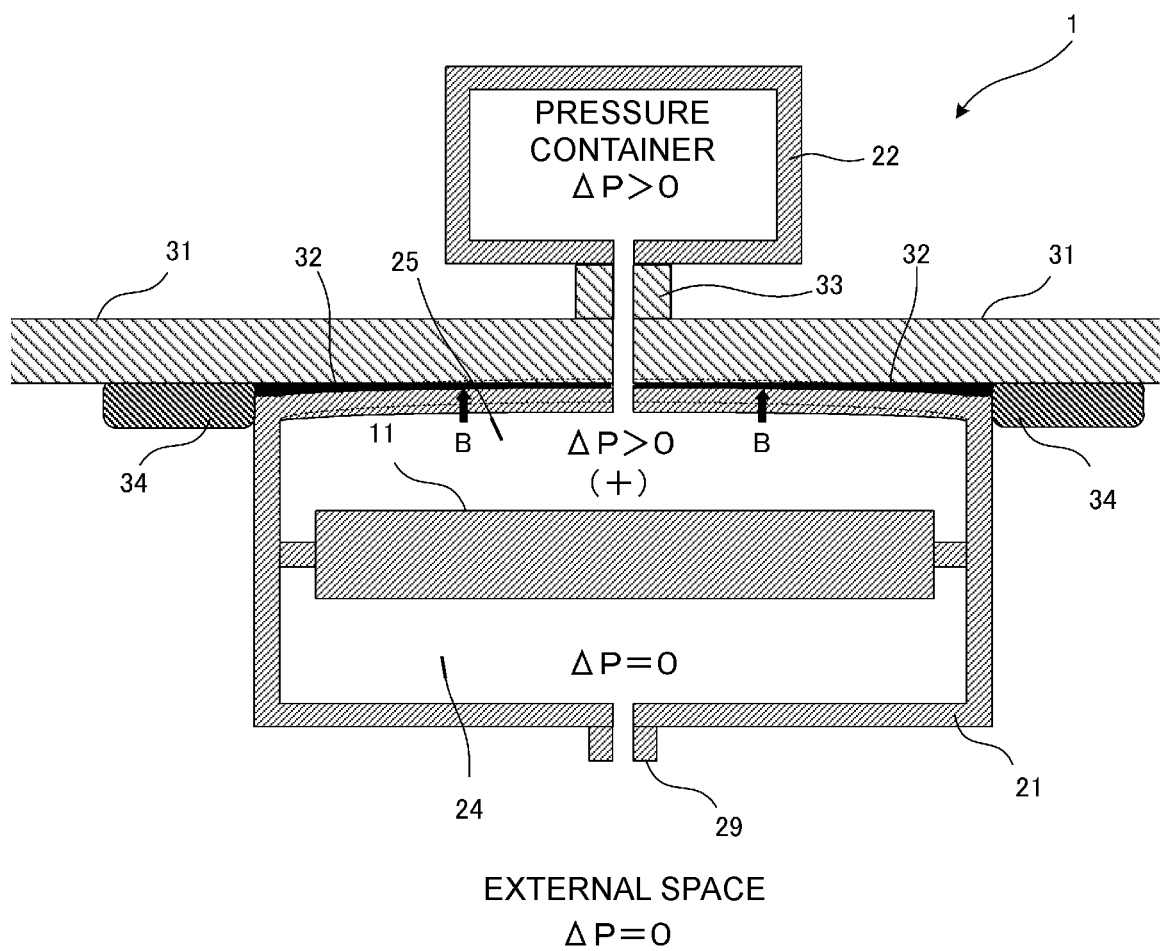
FIG. 9 is a sectional view illustrating a fourth example of deformation that occurs in the fluid control device according to the first embodiment.

FIG. 9 is a diagram illustrating a fourth example of deformation that occurs in the case 21 when the top surface of the case 21 is fixed to the fixing member 31 as the mounting surface B in the case where the fluid control device 1 is formed as a compression device.

In this case, since the top surface of the case 21 is fixed to the fixing member 31 as the mounting surface B, the nozzle 29 may be attached to the bottom surface of the case 21 and may be caused to communicate with the external space, and the nozzle 33 that is attached to the fixing member 31 may be connected to the pressure container 22.

In such a state, when the pump 11 is driven, the pressure difference ΔP between the top-plate-side region 25 of the case 21 and the external space becomes positive, and a force that causes the top surface of the case 21 to deform in a convex manner is generated. However, since the top surface of the case 21 is fixed to the fixing member 31 as the mounting surface B, only a small deformation can occur in the top surface of the case 21.

Thus, also in the fourth example of deformation, the mounting surface B will not be excited, and the probability of the occurrence of undesirable sound and problems due to excitation can be reduced. In addition, in the fourth example of deformation, since the top surface of the case 21 in which deformation may occur is fixed to the fixing member 31, the amount of deformation of the top surface of the case 21 is reduced. Therefore, also in the fluid control device 1 in this case, the probability of separation and cracks occurring in the members included in the multilayer module 3, the probability of undesirable sound being generated by the multilayer module 3, and so forth can be reduced.

As described above, in the fluid control device 1 according to the present embodiment, since the case 21 is mounted on the fixing member 31 by using the top surface or the bottom surface of the case 21 as the mounting surface B, the probability of the occurrence of undesirable sound and problems can be reduced even if any deformation occurs concomitantly with switching of the pressure state. Therefore, problems such as deterioration of the strength with which members are fixed to each other, cracks occurring in the members, and separation of the members are less likely to occur, and the fluid control device 1 that is favorable in terms of quietness and durability can be formed.

Figure 10:
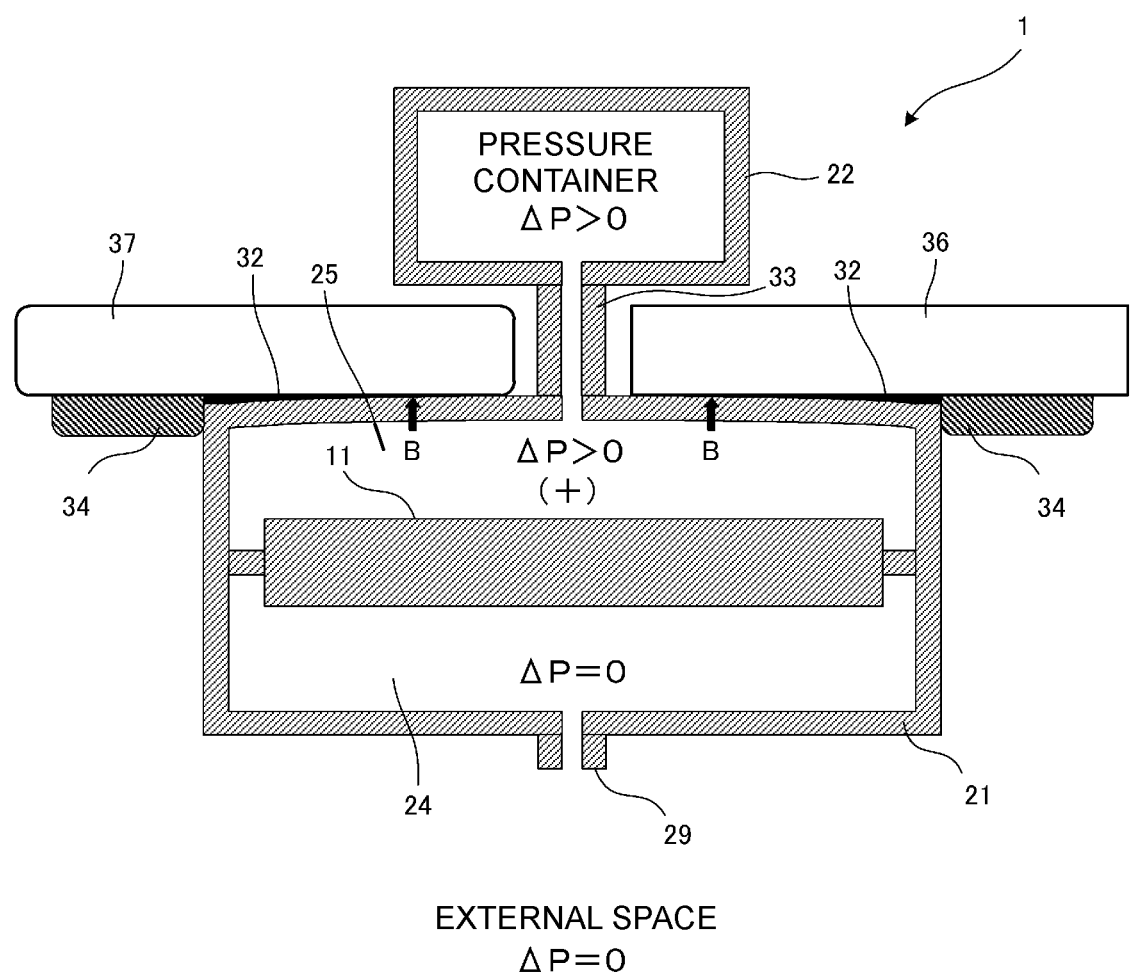
FIG. 10 is a sectional view illustrating a fifth example of deformation that occurs in the fluid control device according to the first embodiment.

FIG. 10 is a diagram illustrating a case in which members excluding a housing of an apparatus into which the fluid control device 1 is to be incorporated are used as fixing members. In this case, the case 21 is bonded to a surface of a heat dissipator 36, such as a heat sink, and to a surface of a battery 37 with the adhesive sheet 32 interposed between the case 21 and these surfaces. In this manner, the heat dissipator 36, such as a heat sink, and the battery 37 may be used as fixing members.

Figure 11:
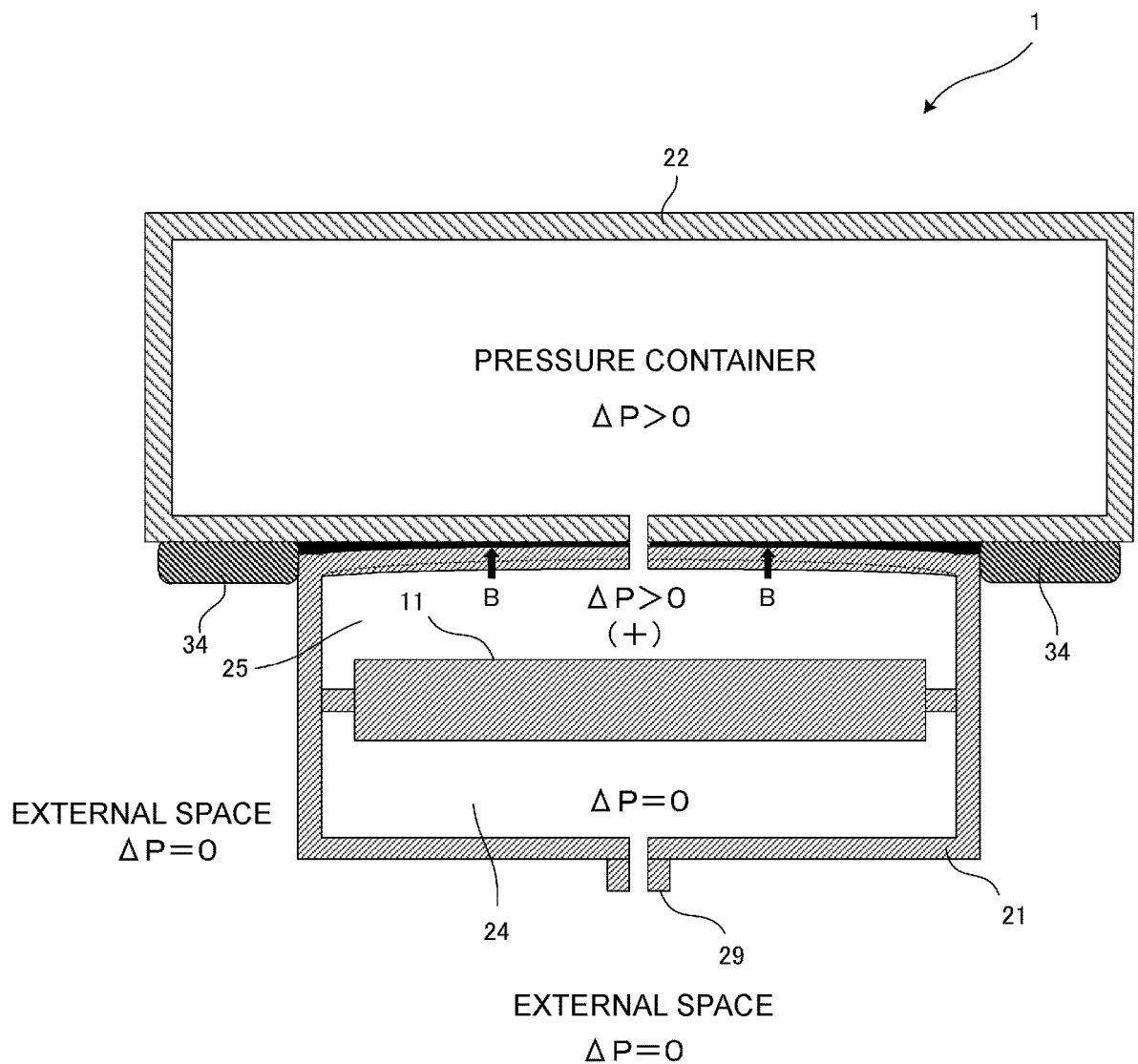
FIG. 11 is a sectional view illustrating a sixth example of deformation that occurs in the fluid control device according to the first embodiment.

FIG. 11 is a diagram illustrating another case in which members excluding a housing of an apparatus into which the fluid control device 1 is to be incorporated are used as fixing members. In this case, the case 21 is bonded to an outer surface of the pressure container 22. In this manner, the pressure container 22 may be used as a fixing member.

Second Embodiment

A fluid control device 1A according to a second embodiment will now be described.

Figure 12:
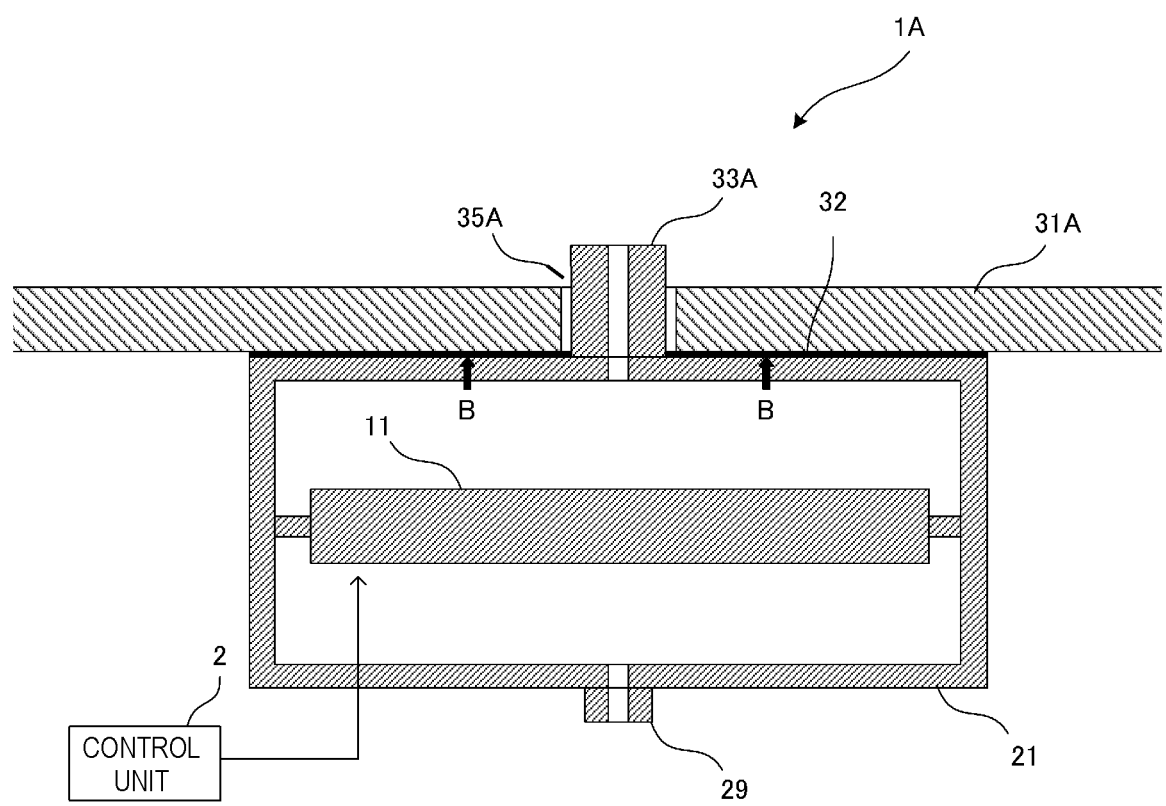
FIG. 12 is a sectional view illustrating a configuration example of a fluid control device according to a second embodiment.

FIG. 12 is a sectional view schematically illustrating the fluid control device 1A according to the second embodiment.

The difference between the fluid control device 1A described herein and the first embodiment is that the fluid control device 1A includes a fixing member 31A and a nozzle 33A and does not include the packing member 34. The nozzle 33A is to be connected to a pressure container and attached not to the fixing member 31A, but to the case 21 so as to project from the mounting surface B and pass through the fixing member 31A. The fixing member 31A has a cavity 35A into which the nozzle 33A is inserted.

In the fluid control device 1A having such a configuration, even if an adhesive failure has occurred in the adhesive sheet 32, since the nozzle 33A projects directly from the case 21, the airtightness between the fixing member 31A and the case 21 will not be a problem. Therefore, it is not necessary to provide a member, such as a packing member, that improves airtightness, and a simpler configuration can be employed for fixing the fixing member 31A and the case 21 to each other.

Third Embodiment

A fluid control device 1E according to a third embodiment will now be described.

Figure 13:
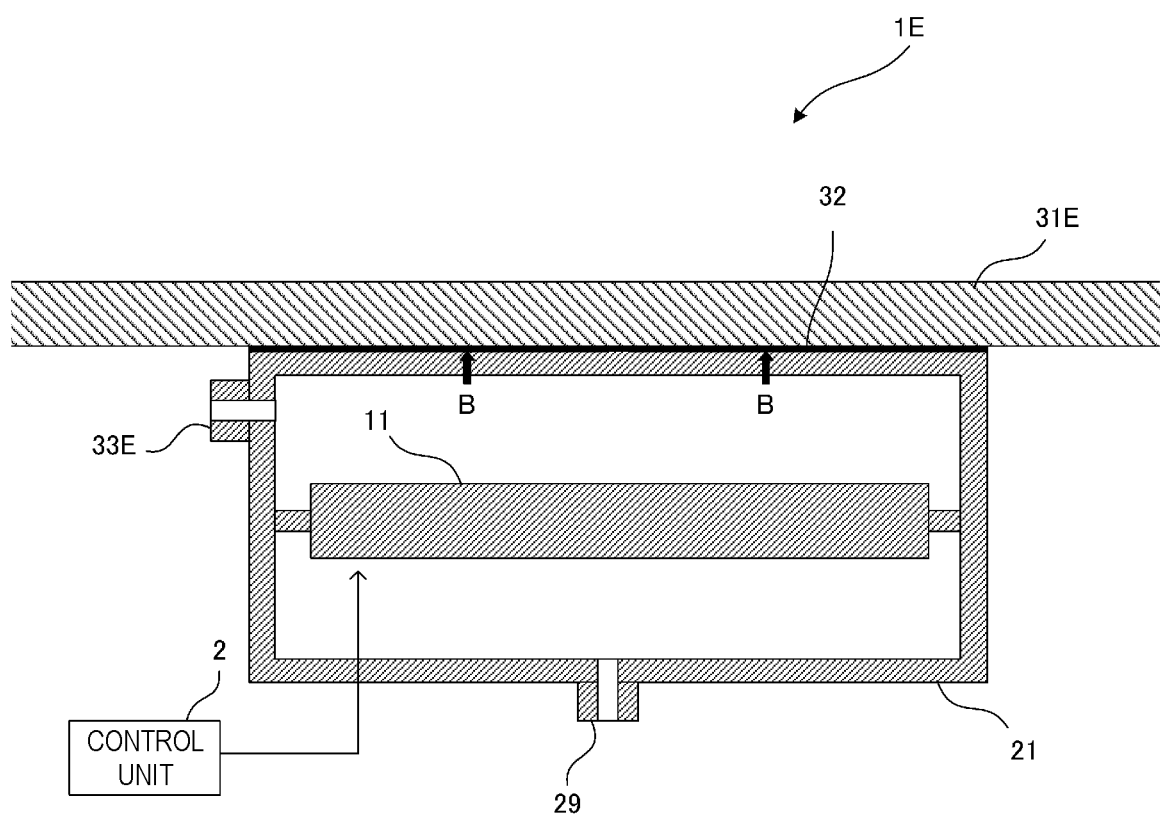
FIG. 13 is a sectional view illustrating a configuration example of a fluid control device according to a third embodiment.

FIG. 13 is a sectional view schematically illustrating the fluid control device 1E according to the third embodiment.

The difference between the fluid control device 1E described herein and the first embodiment is that the fluid control device 1E includes a fixing member 31E and a nozzle 33E and does not include the packing member 34. The nozzle 33E is provided so as to project from one of the side surfaces of the case 21. The fixing member 31E has no cavity.

Also in the fluid control device 1E having such a configuration, even if an adhesive failure has occurred in the adhesive sheet 32, the airtightness between the fixing member 31E and the case 21 will not be a problem, and thus, the fixing member 31E and the case 21 can be fixed to each other with a simple configuration in which a packing member or the like is not provided. In addition, the area of a portion in which the fixing member 31E and the case 21 are joined together increases, and thus, the rigidity of the portion can be improved, so that the probability of the occurrence of deformation can be further reduced.

In addition, as the difference from the second embodiment, the nozzle 33E is provided such that the nozzle 33E faces in a direction approximately parallel to the adhesive sheet 32. Thus, when the nozzle 33E is inserted and extracted into and from a pressure container, a stress in a shearing direction is applied to the adhesive sheet 32, and thus, the strength of the mounting surface can be further enhanced.

Fourth Embodiment

A fluid control device 1B according to a fourth embodiment will now be described.

Figure 14:
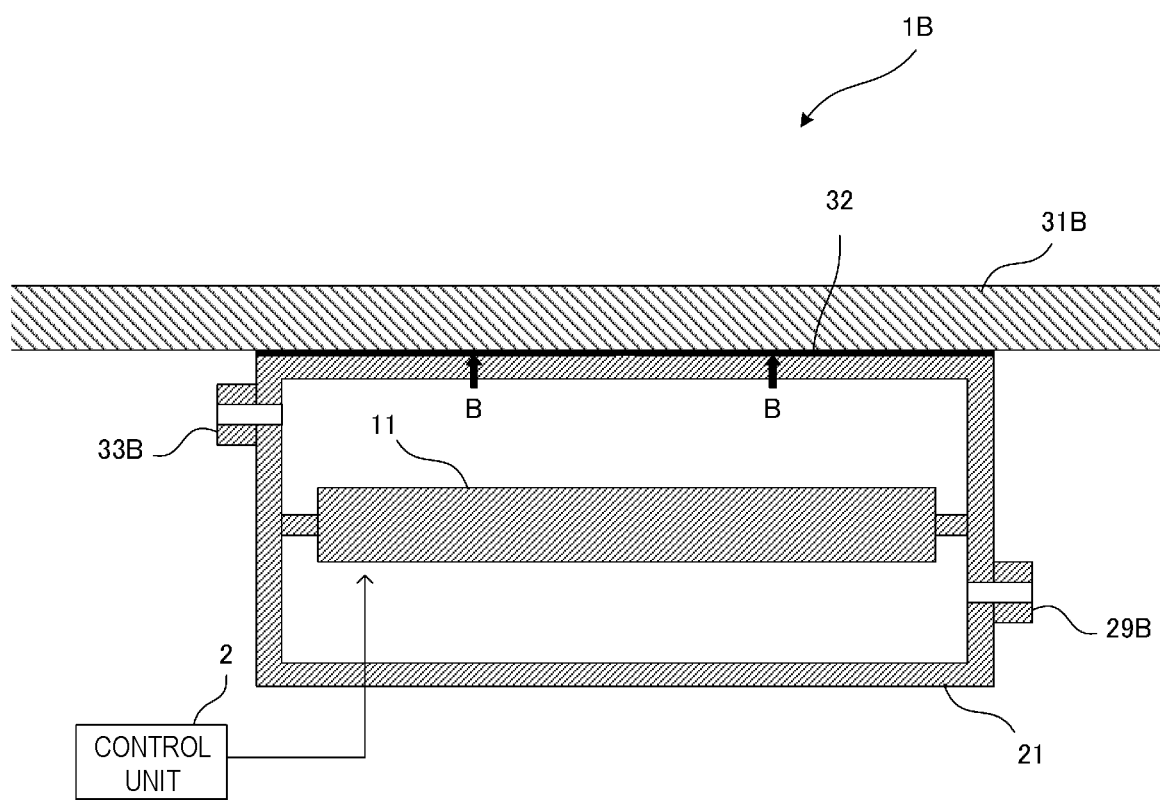
FIG. 14 is a sectional view illustrating a configuration example of a fluid control device according to a fourth embodiment.

FIG. 14 is a sectional view schematically illustrating the fluid control device 1B according to the fourth embodiment.

The difference between the fluid control device 1B described herein and the first embodiment is that the fluid control device 1B includes a fixing member 31B and nozzles 29B and 33B and does not include the packing member 34. Each of the nozzles 29B and 33B is provided so as to project from one of the side surfaces of the case 21. The fixing member 31B has no cavity.

Also in the fluid control device 1B having such a configuration, as in the third embodiment, the fixing member 31B and the case 21 can be fixed to each other with a simple configuration, and the rigidity of a portion in which the fixing member 31E and the case 21 are joined together can be improved. In addition, in the fluid control device 1B, since the nozzles 29B and 33B are provided on the side surfaces of the case 21, the case 21 and the nozzles 29B and 33B can be formed thin on the whole.

Fifth Embodiment

A decompression device 1C according to a fifth embodiment will now be described.

Figure 15:
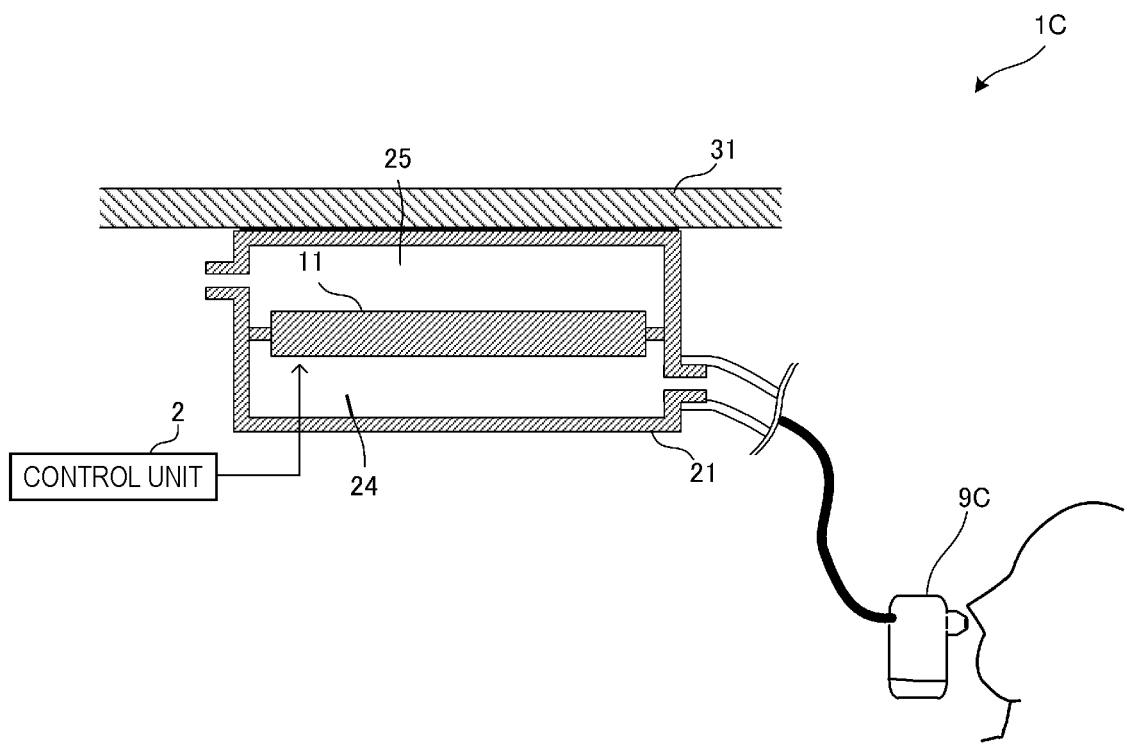
FIG. 15 is a sectional view schematically illustrating a decompression device according to a fifth embodiment.

FIG. 15 is a diagram schematically illustrating the decompression device 1C according to the fifth embodiment.

The decompression device 1C includes the pump 11, the case 21, the fixing member 31 and a pressure container 9C. The pressure container 9C is configured to be attached to, for example, an adaptor for nasal suction, breast feeding, or secretion aspiration using negative pressure wound therapy (NPWT) and is in communication with the bottom-plate-side region 24 of the case 21, the pressure in which becomes a negative pressure with respect to that in the external space, through a connection tube or the like. The decompression device 1C can cause the pressure in the pressure container 9C to become a negative pressure with respect to that in the external space by driving the pump 11 and can suck in an external fluid through the pressure container 9C.

Note that, in the case where a suction port of the pressure container 9C is opened under atmospheric pressure during the period when a sucked substance is being removed or during driving the pump 11, there is a possibility that a sudden pressure change will propagate to the bottom-plate-side region 24, and undesirable sound and problems will occur in the case. However, since the top surface of the case 21 in which only a small deformation may occur is fixed to the fixing member 31, deformation of the case 21 will not be transmitted to the fixing member 31, and deformation of the fixing member 31 can be suppressed. In addition, the probability of occurrence of problems associated with the decompression device can be reduced, and propagation of undesirable sound to the outside of the decompression device can be suppressed.

Sixth Embodiment

A compression device 1D according to a sixth embodiment will now be described.

Figure 16:
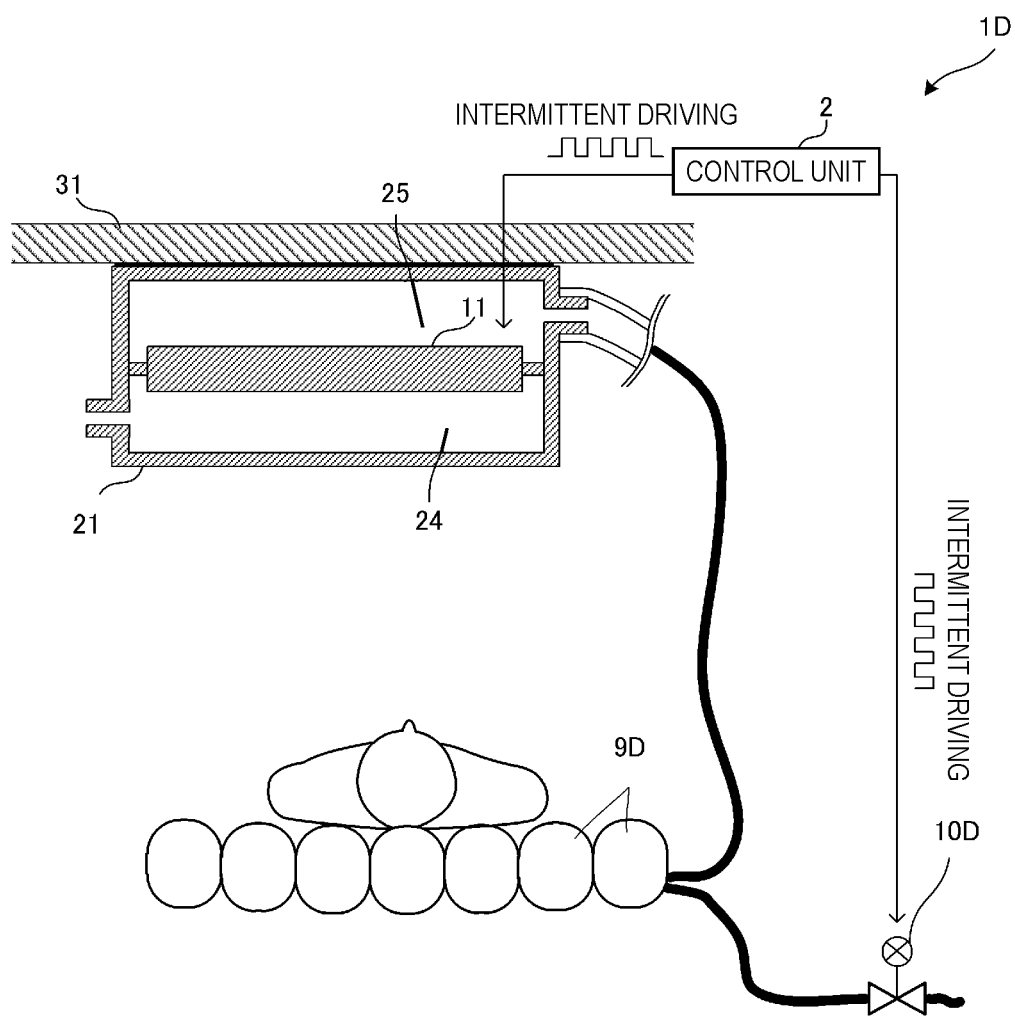
FIG. 16 is a sectional view schematically illustrating a compression device according to a sixth embodiment.
Figure 17A:
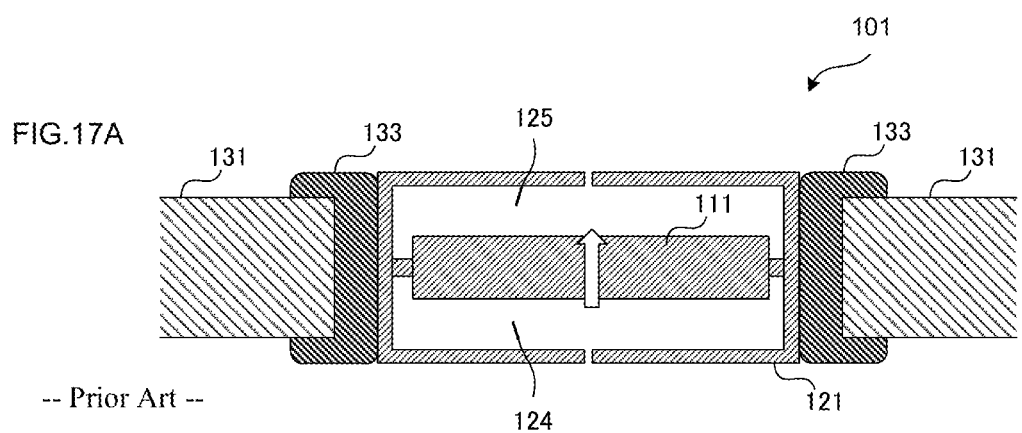
FIG. 17A is a schematic diagram illustrating an example of a mounting structure of the related art for mounting a pump in a fluid control device.
Figure 17B:
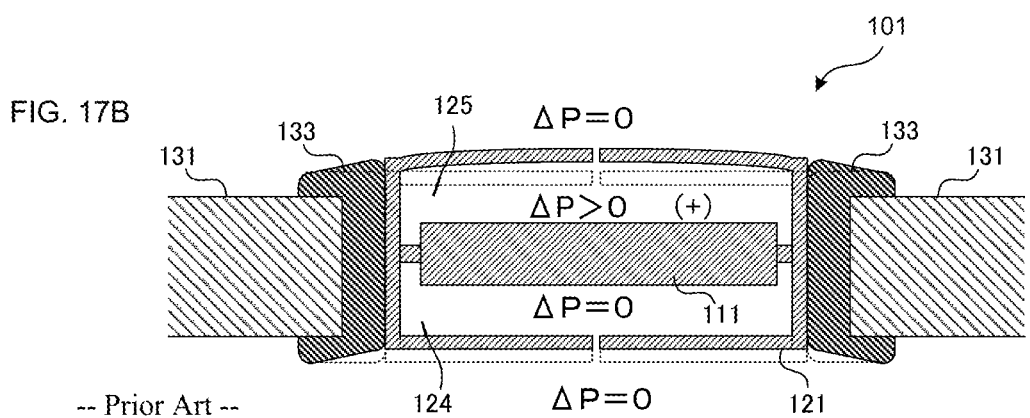
FIG. 17B is a diagram schematically illustrating deformation that occurs in the case where the fluid control device 101 is formed as a compression device.

FIG. 16 is a diagram schematically illustrating the compression device 1D according to the sixth embodiment.

The compression device 1D includes the pump 11, the case 21, the fixing member 31, and a pressure container 9D. The pressure container 9D is, for example, an air mat for lying down or a cuff of a sphygmomanometer and is in communication with the top-plate-side region 25 of the case 21 having a positive pressure with respect to that in the external space, by using a connection tube or the like. The compression device 1D can cause the pressure in the pressure container 9D to become a positive pressure with respect to that in the external space by driving the pump 11.

Note that, for example, when the compression device 1D includes an air mat for lying down as the pressure container 9D, an exhaust solenoid valve 10D may be attached to the air mat for lying down, and the control unit 2 may control drawing of the air into the pressure container 9D (air mat) by using the pump 11 and also exhausting of the air from the pressure container 9D (air mat) by using the solenoid valve 10D. In this case, a function of dispersing body pressure, a function of preventing bedsores, and so forth can be realized by causing the control unit 2 to perform control such that the drawing of the air into the pressure container 9D (air mat) and the exhausting of the air from the pressure container 9D (air mat) are periodically switched.

For the purpose of, for example, causing the control unit 2 to intermittently operate the pump 11 as described above, the pressure state in the case 21 frequently changes, and thus, it is particularly effective to mount the case 21 to the fixing member 31 by using the top surface or the bottom surface of the case 21 so as to reduce the probability of the occurrence of undesirable sound and problems. Note that, also in the case where the fluid control device is formed not as a compression device, but as a decompression device, for example, when the fluid control device is used for secretion aspiration using negative pressure wound therapy, it is necessary to intermittently operate, as time passes, the pump 11 by using the control unit 2, and thus, again, it is particularly effective to mount the case 21 to the fixing member 31 by using the top surface or the bottom surface of the case 21 so as to reduce the probability of the occurrence of undesirable sound and problems.

Note that, when a user gets on or rolls over in the air mat for lying down, there is a possibility that a sudden pressure change will occur in the pressure container 9D, and the pressure change will propagate to the top-plate-side region 25, which in turn results in the occurrence of undesirable sound and problems. However, by fixing the top plate of the case 21 to the fixing member 31, the probability of the occurrence of the undesirable sound and the problems can be reduced.

Other Embodiments

In the above-described embodiments, although a gas has been used as the fluid, the fluid control device can be implemented by using any fluid other than a gas that is, for example, a liquid, a powder (a gas-solid mixed fluid), a solid-liquid mixed fluid, a gas-liquid mixed fluid, a gel, or the like can be used as the fluid.

In the above-described embodiments, although a valve that has a multilayer structure and that includes a valve film has been used as the valve portion, the fluid control device can be implemented by employing a valve structure different from the above. The valve portion may have a check-valve structure with which the flow direction of the fluid is constantly controlled regardless of the operating state of the pump or may have a valve structure with which a valve function becomes ineffective as driving of the pump is discontinued. Alternatively, for example, a valve structure with which the area of a portion of a flow path communicating with the pump chamber increases and decreases along with the vibration of the actuator may be employed.

In the above-described embodiments, although the actuator is piezoelectrically driven, the fluid control device can be implemented by causing the actuator to operate by a different driving method such as, for example, electromagnetic driving. In addition, the fluid control device can be implemented by changing the shape of the pump, the shape of the flow path communicating with the pump, and so forth.

In the above-described embodiments, although a PZT-based ceramic has been used as the piezoelectric material, the fluid control device can be implemented by using a different piezoelectric material that is, for example, a non-lead-based piezoelectric ceramic such as a potassium-sodium niobate-based ceramic or an alkali niobate-based ceramic as the piezoelectric material.

In the above-described embodiments, although a unimorph type actuator in which a piezoelectric element is provided on one surface of the vibrating plate has been used, the fluid control device can be implemented by using a different actuator that is, for example, a bimorph type actuator in which a piezoelectric element is provided on each of the two surfaces of a vibrating plate.

In the above-described embodiments, although members each having a circular external shape and a circular internal shape have been used as the members forming the multilayer module, the fluid control device can be implemented by using members having other external shapes and other internal shapes, which are, for example, an elliptical shape, a polygonal shape, and the like.

Lastly, the descriptions of the above-described embodiments are examples in all respects, and the present disclosure is not to be considered limited to the embodiments. The scope of the present disclosure is to be determined not by the above-described embodiments, but by the claims. In addition, it is intended that meanings equal to the claims and all the modifications within the scope of the claims are included in the scope of the present disclosure.

B mounting surface
1, 1A, 1B fluid control device
1C decompression device
1D compression device
2 control unit
3 multilayer module
9C, 9D pressure container
10D solenoid valve
11 pump
12 valve
13 actuator
21 case
22 pressure container
24 bottom-plate-side region
25 top-plate-side region
26 partition wall
27 protrusion
28 groove
29, 33 nozzle
31 fixing member
32 adhesive sheet
33 nozzle
34 packing member
35 a fixing portion
36 heat dissipator
37 battery
41 case top plate
42 valve top plate
43 valve side plate
44 valve film
45 valve bottom plate
46 pump side plate
47 vibrating plate
48 piezoelectric element
49 case side plate
50 case bottom plate
51, 52, 53, 54, 55, 56, 57, 58, 60 cavity
59 internal space

The invention claimed is:

1. A fluid control device comprising:
a case having a flat plate structure, the case including a top plate, a side plate, and a bottom plate each surrounding an internal space and having an inlet and an outlet allowing the internal space to communicate with an external space;
a valve portion dividing the internal space into a first air chamber communicating with the inlet and a second air chamber communicating with the outlet; and
a fixing member fixing the case in place,
wherein one of the first air chamber and the second air chamber is located closer to the bottom plate of the case, and another one of the first air chamber and the second air chamber is located closer to the top plate of the case,
wherein the case is mounted on the fixing member by using the top plate or the bottom plate as a mounting surface, and
wherein the fixing member is a circuit board, a battery, a heat sink, a heat pipe, or a housing of the fluid control device.

2. The fluid control device according to claim 1, wherein the fixing member is made of a material having a higher rigidity than a material of the mounting surface.

3. The fluid control device according to claim 1, further comprising a packing member that surrounds an outer periphery of the mounting surface and contacts the case and fixing member.

4. The fluid control device according to claim 1, wherein the fixing member supports the case.

5. The fluid control device according to claim 1, further comprising:
a control unit allowing the valve portion to intermittently operate.

6. A decompression device comprising:
the fluid control device according to claim 1; and
a pressure container communicating with a region of one of the first air chamber and the second air chamber decompressed below a pressure in an external space.

7. A compression device comprising:
the fluid control device according to claim 1;
a pressure container communicating with a region of one of the first air chamber and the second air chamber compressed above a pressure in an external space.

8. The fluid control device according to claim 1,
wherein, during a period when the valve portion is operating, a pressure difference between a pressure in one of the first air chamber and the second air chamber located closer to the mounting surface and a pressure in the external space is larger than a pressure difference between a pressure in another one of the first air chamber and the second air chamber and the pressure in the external space.

9. A decompression device comprising:
the fluid control device according to claim 8; and
a pressure container communicating with a region of one of the first air chamber and the second air chamber decompressed below a pressure in an external space,
wherein the fixing member is the pressure container, and
wherein the mounting surface is a surface closer to one of the first air chamber and the second air chamber having a greater pressure difference to the pressure in the external space than a pressure difference between a pressure in another one of the first air chamber and the second air chamber and the pressure in the external space.

10. A compression device comprising:
the fluid control device according to claim 8;
a pressure container communicating with a region of one of the first air chamber and the second air chamber compressed above a pressure in an external space,
wherein the fixing member is the pressure container, and
wherein the mounting surface is a surface closer to one of the first air chamber and the second air chamber having a greater pressure difference to the pressure in the external space than a pressure difference between a pressure in another one of the first air chamber and the second air chamber and the pressure in the external space.

11. The fluid control device according to claim 8, further comprising:
a nozzle allowing the internal space to communicate with a pressure container,
wherein the nozzle projects from the mounting surface and passes through the fixing member.

12. The fluid control device according to claim 8, further comprising:
a nozzle allowing the internal space to communicate with a pressure container,
wherein the nozzle is provided on the side plate.

13. The fluid control device according to claim 8, further comprising:
a control unit allowing the valve portion to intermittently operate.

14. A decompression device comprising:
the fluid control device according to claim 8; and
a pressure container communicating with a region of one of the first air chamber and the second air chamber decompressed below a pressure in an external space.

15. The fluid control device according to claim 1,
wherein, during a period when the valve portion is operating, a pressure difference between a pressure in one of the first air chamber and the second air chamber located closer to the mounting surface and a pressure in the external space is smaller than a pressure difference between a pressure in another one of the first air chamber and the second air chamber and the pressure in the external space.

16. The fluid control device according to claim 15, further comprising:
a nozzle allowing the internal space to communicate with a pressure container,
wherein the nozzle projects from the mounting surface and passes through the fixing member.

17. The fluid control device according to claim 15, further comprising:
a nozzle allowing the internal space to communicate with a pressure container,
wherein the nozzle is provided on the side plate.

18. The fluid control device according to claim 15, further comprising:
a control unit allowing the valve portion to intermittently operate.

19. A decompression device comprising:
the fluid control device according to claim 15; and
a pressure container communicating with a region of one of the first air chamber and the second air chamber decompressed below a pressure in an external space.

20. The fluid control device according to claim 1, further comprising:
a nozzle allowing the internal space to communicate with a pressure container,
wherein the nozzle projects from the mounting surface and passes through the fixing member.

21. The fluid control device according to claim 20, further comprising:
a control unit allowing the valve portion to intermittently operate.

22. The fluid control device according to claim 1, further comprising:
a nozzle allowing the internal space to communicate with a pressure container,
wherein the nozzle is provided on the side plate.

23. The fluid control device according to claim 22, further comprising:
a control unit allowing the valve portion to intermittently operate.

* * * * *